(12) United States Patent
Joos et al.

(10) Patent No.: US 10,308,270 B2
(45) Date of Patent: Jun. 4, 2019

(54) SEAT DEVICE

(71) Applicant: Micro Mobility Systems AG, Kuesnacht (CH)

(72) Inventors: Pascal Joos, Kuesnacht (CH); Johnny Garfield Wong, Long Beach, CA (US); Marin Runje, Torrance, CA (US)

(73) Assignee: MICRO MOBILITY SYSTEMS AG, Kuesnacht (CH)

( * ) Notice: Subject to any disclaimer, the term of this patent is extended or adjusted under 35 U.S.C. 154(b) by 109 days.

(21) Appl. No.: 15/102,416

(22) PCT Filed: Dec. 19, 2014

(86) PCT No.: PCT/EP2014/078875
§ 371 (c)(1),
(2) Date: Jun. 7, 2016

(87) PCT Pub. No.: WO2015/092023
PCT Pub. Date: Jun. 25, 2015

(65) Prior Publication Data
US 2016/0318539 A1    Nov. 3, 2016

(30) Foreign Application Priority Data

Dec. 19, 2013  (DE) .................. 10 2013 114 529

(51) Int. Cl.
*B62B 9/00*      (2006.01)
*B62B 9/26*      (2006.01)
(Continued)

(52) U.S. Cl.
CPC ............... *B62B 9/26* (2013.01); *B62B 7/006* (2013.01); *B62B 9/20* (2013.01); *B62H 7/00* (2013.01);
(Continued)

(58) Field of Classification Search
CPC ........ B62K 3/002; B62K 15/006; B62K 9/00; B62B 9/26; B62B 7/006; B62B 9/20; B62B 5/082
See application file for complete search history.

(56) References Cited

U.S. PATENT DOCUMENTS 3,079,172 A * 2/1963 Burwell ............... B62K 15/008
                                                  180/208
3,316,993 A * 5/1967 Weitzner .................. A45C 5/14
                                                  180/208
(Continued)

FOREIGN PATENT DOCUMENTS

CN          2205346 Y       8/1995
CN        202754075 U       2/2013
(Continued)

OTHER PUBLICATIONS

German search report in the priority German application No. DE 102013114529.9; dated Nov. 5, 2014; along with a partial English translation.
(Continued)

*Primary Examiner* — Hau V Phan
(74) *Attorney, Agent, or Firm* — Cowan, Liebowitz & Latman, P.C.

(57) ABSTRACT

A seat device for a kickboard, with a seat unit and with at least one first fastening unit for fastening to the kickboard. The seat device comprises at least one storage unit with at least one receiving region that is provided for receiving objects and is at least approximately completely enclosed in at least one state.

12 Claims, 17 Drawing Sheets

Figure 1:
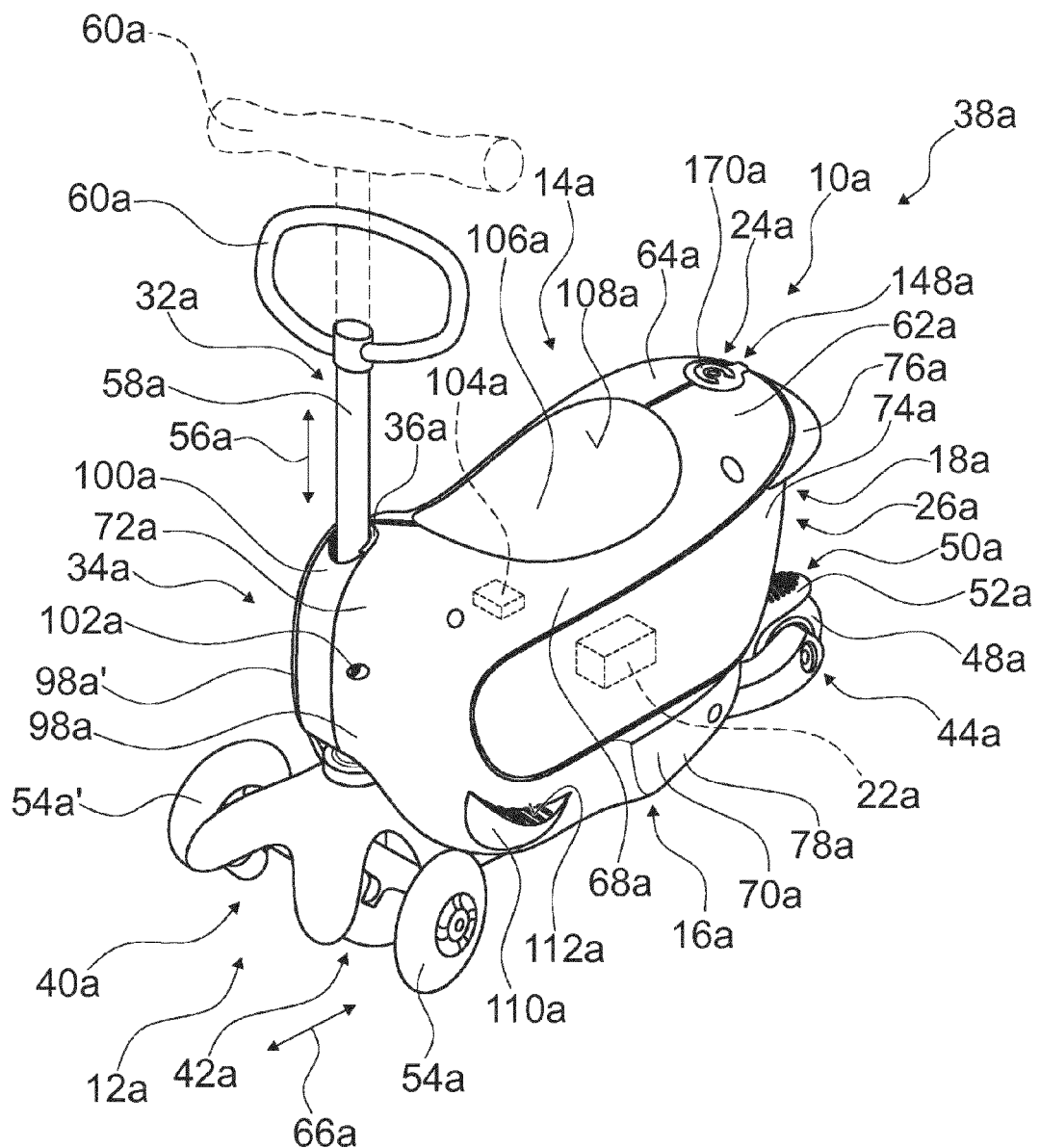

(51) Int. Cl.
*B62H 7/00* (2006.01)
*B62K 3/00* (2006.01)
*B62K 9/02* (2006.01)
*B62J 9/00* (2006.01)
*B62K 9/00* (2006.01)
*B62B 7/00* (2006.01)
*B62B 9/20* (2006.01)
*B62J 1/12* (2006.01)

(52) U.S. Cl.
CPC ............... *B62J 9/001* (2013.01); *B62K 3/002* (2013.01); *B62K 9/00* (2013.01); *B62K 9/02* (2013.01); *B62J 1/12* (2013.01)

(56) References Cited

U.S. PATENT DOCUMENTS

| | | | | |
|---|---|---|---|---|
| 3,580,349 | A | * | 5/1971 | Brennan .............. B62D 21/183 180/208 |
| 3,902,739 | A | * | 9/1975 | Kimura .................... B62K 9/00 280/249 |
| 4,262,080 | A | * | 4/1981 | Frosch ...................... G03F 7/11 430/271.1 |
| 4,264,080 | A | | 4/1981 | Kassai |
| 4,346,908 | A | * | 8/1982 | Kassai ................... A63G 19/18 280/827 |
| 4,759,557 | A | * | 7/1988 | Kassai ................... A63G 19/18 280/1.14 |
| 4,786,070 | A | * | 11/1988 | Adee .................... B62K 15/006 280/278 |
| D327,101 | S | * | 6/1992 | Halter .......................... D21/425 |
| 5,265,695 | A | * | 11/1993 | Piazzi .................... B62K 3/002 180/208 |
| 6,408,967 | B1 | * | 6/2002 | Huntsberger .......... A63H 33/28 180/53.1 |
| 6,457,544 | B1 | * | 10/2002 | Sung ....................... B62K 3/002 180/208 |
| 6,811,173 | B1 | | 11/2004 | Shih |
| 8,469,374 | B2 | * | 6/2013 | Graf Von Bismarck .................... A45C 5/146 280/30 |
| 8,517,403 | B2 | * | 8/2013 | Jessie, Jr. ................. B62K 9/00 280/7.1 |
| 8,523,193 | B1 | * | 9/2013 | Mucaro .................. B62B 5/082 280/7.15 |
| 8,636,293 | B2 | * | 1/2014 | Eliasson ................ B62K 3/002 280/221 |
| 8,838,308 | B2 | * | 9/2014 | Meyers ................... B62J 17/00 174/53 |
| 2002/0017773 | A1 | * | 2/2002 | Chow ...................... F16C 33/20 280/639 |
| 2002/0121757 | A1 | | 9/2002 | Louh |
| 2004/0238303 | A1 | * | 12/2004 | Hafif ....................... A45C 5/143 190/18 A |
| 2005/0057012 | A1 | | 3/2005 | Boyle et al. |
| 2006/0048532 | A1 | * | 3/2006 | Beal ........................ B60P 3/20 62/239 |
| 2011/0198819 | A1 | | 8/2011 | Jessie, Jr. |
| 2011/0198822 | A1 | | 8/2011 | Jessie, Jr. |
| 2012/0048059 | A1 | | 3/2012 | Sun |
| 2014/0311815 | A1 | | 10/2014 | Reck |

FOREIGN PATENT DOCUMENTS

| | | |
|---|---|---|
| CN | 202879701 U | 4/2013 |
| DE | 92 05 475 U1 | 6/1992 |
| DE | 201 11 861 U1 | 2/2002 |
| DE | 101 09 376 A1 | 9/2002 |
| DE | 20 2011 001 596 U1 | 4/2011 |
| DE | 10 2011 106 561 A1 | 12/2011 |
| DE | 20 2012 002 990 U1 | 7/2012 |
| DE | 102011 113 226 A1 | 3/2013 |
| FR | 2 607 089 A1 | 5/1988 |
| FR | 2 759 126 A1 | 8/1998 |
| FR | 2 780 298 A1 | 12/1999 |
| FR | 2 895 725 A1 | 7/2007 |
| GB | 2 263 258 A | 7/1993 |
| JP | 2011-201500 A | 10/2011 |
| JP | 2012-517372 A | 8/2012 |
| KR | 20130002375 A | 4/2013 |

OTHER PUBLICATIONS

Written Opinion in the corresponding International Application, PCT/EP2014/078875 dated Jun. 23, 2015.

Danielle Harper, "Radio Flyer Ride 2 Glide—Two Fun Toys for the Price of One!", (Nov. 11, 2013), p. 1-4, Happenings of the Harper Household, URL:http://happeningsoftheharperhousehold.net/2013/11/radio-flyer-ride-2-glide-two-fun-toys-for-the-price-of-one/, (Nov. 12, 2013), XP002737619 [A] 1,15 the whole document.

"Radio Flyer Ride 2 Glide—Two Fun Toys for the Price of One!", (Nov. 12, 2013), p. 1-1, Google, URL:https://www.google.de/search?q=ride+two+glide+radio+flyer&biw=1977&bih=1160&source=Int&tbs=cdr%3A1%2Ccd_min%3A%2Ccd_max%3A19.12.2013&tbm=#tbs=cdr:1%2Ccd_max:19.12.2013&q=ride+to+glide+radio+flyer, (Jan. 23, 2015), XP002737629 the whole document.

International Search Report of the corresponding International Application, PCT/EP2014/078875 dated Jun. 23, 2015.

Feb. 15, 2017 Korean Office Action, that issued in Korean Patent Application No. 10 2016-16257 (English Summary enclosed).

Jan. 25, 2018 Chinese Office Action, that issued in Chinese Patent Application No. 201480070283.5 (English Summary enclosed).

* cited by examiner

SEAT DEVICE

CROSS REFERENCE TO RELATED APPLICATIONS

This is a U.S. national phase of application No. PCT/EP2014/078875, filed on Dec. 19, 2014. Priority under 35 U.S.C. § 119(a) and 35 U.S.C. § 365(b) is claimed from German Patent Application No. DE 10 2013 114 529.9, filed on Dec. 19, 2013.

STATE OF THE ART

The invention relates to a seat device according to the preamble of claim 1.

A seat device for a kick scooter, in particular for a kickboard, has already been proposed, with a seat unit and with at least one first fastening unit for fastening to a scooter.

The objective of the invention is in particular to provide a generic device having improved characteristics regarding an easy assembly, regarding a construction, regarding making use of space, regarding a variability of usage and/or in particular regarding a child-friendliness. The objective is achieved according to the invention by the features of patent claim 1, while advantageous implementations and further developments of the invention may be gathered from the subclaims.

Advantages of the Invention

The invention is based on a seat device for a kick scooter, in particular for a kickboard, with a seat unit and with at least one first fastening unit for fastening to the kick scooter. It is proposed that the seat device comprises at least one storage unit with at least one receiving region, which is provided to receive objects and is at least approximately completely enclosed in at least one state. Preferably the storage unit comprises a substantial receiving region that is provided to receive objects. Preferentially the seat device is provided for a children's kick scooter. Particularly preferably the at least one first fastening unit is provided, in particular, for a releasable fastening to the kick scooter. Principally it is, however, also conceivable that the seat device is firmly connected to the kick scooter via the at least one first fastening unit. A variety of objects are conceivable which are deemed expedient by a person having ordinary skill in the art and which can be received in the receiving region. In particular, any objects desired by a user can be received in the receiving region. Particularly preferably the seat device is provided as a separate add-on device for the kick scooter, which can be mounted to the kick scooter subsequently. A "seat device" is to be understood, in this context, in particular as a device that comprises at least one seat surface and is intended to provide an opportunity for sitting. A "kick scooter" is to be understood, in this context, in particular as a non-motorized, muscle-force driven vehicle with at least two rolls respectively wheels. It is preferably to be understood as a scooter with at least one footboard that is provided to receive a foot as well as a substantial part of a user's weight in at least one state. Particularly preferably it is in particular to be understood as a scooter which is in at least one state driven at least partially by a user's muscle force by pushing off with at least one leg. The kick scooter can herein, in particular, also be used in another way that is deemed expedient by a person having ordinary skill in the art, but is principally suitable, in particular provided, for a use as has been described. Herein a "muscle-force driven vehicle" is to be understood, in particular, as a means of locomotion which is moved at least substantially by using a user's and/or rider's muscle force. Preferentially it is to be understood, in particular, as a means of locomotion which is at least substantially driven without machines and/or external energy, e.g. wind. Herein "at least substantially" is to mean in particular by at least 70%, preferably by at least 80%, preferentially by at least 90% and particularly preferentially by at least 99%. Furthermore, in this context by a "kickboard" is to be understood in particular a kick scooter with at least three rolls. Preferably at least two of the at least three rolls are arranged in a frontal region of the kick scooter, in particular at a front axle. Preferably it is to be understood as a kick scooter with a front axle that is movable about and/or along at least two axes with respect to a footboard of the kick scooter. Particularly preferably it is to be understood as a kick scooter that is provided to be steered at least substantially by weight-shifting. In particular, it is to be understood as a kick scooter with a rotationally rigid steering rod, which is steered exclusively by weight-shifting. Furthermore, a "seat unit" is to be understood, in this context, in particular as a unit of the seat device comprising a seat surface and/or implementing a seat surface. A "fastening unit" is to be understood, in this context, in particular as a unit that is provided to fasten the scooter seat device to at least one further device and/or further apparatus. Preferentially it is to be understood, in particular, as a unit which is provided to connect the scooter seat device with at least one further device and/or further apparatus by form-lock and/or force-lock. "Connected by force-lock and/or form lock" is to mean, in particular, a releasable connection, wherein a holding force between two structural elements is transferred preferably by the structural elements geometrically engaging one into the other, and/or wherein a friction force is transferred between the structural elements. Further in this context, "releasable" is to mean in particular "non-destructively separable". Furthermore in this context, a "storage unit" is to be understood, in particular, as a unit of the seat device which at least partially comprises a storage surface, a storage region and/or a storage space for keeping objects. Preferentially the unit comprises a receiving region for receiving objects. Moreover, a "receiving region" is to be understood, in this context, in particular as a region that serves for receiving objects. Preferably it is to be understood, in particular, as a storage space. Preferably the region is encompassed at least approximately completely by material units and/or elements of the seat device in at least one plane, preferably in a plane extending through a geometrical center of the receiving region. Particularly preferably the receiving region is delimited by material units and/or elements of the seat device in at least four, preferably in at least five spatial directions, starting from a geometrical center of the receiving region. Preferentially the receiving region is implemented in particular by a substantial receiving region. Herein an "essential receiving region" is to be understood, in particular, as a receiving region having a volume of at least 2 liters, preferably at least 4 liters and particularly preferably at least 6 liters. Preferably it is to be understood, in particular, as a receiving region occupying at least 10%, preferably at least 20% and particularly preferably at least 30% of a volume of the seat device. "Provided" is to mean, in particular, specifically designed and/or equipped. By an object being provided for a certain function is to be understood, in particular, that the object implements and/or carries out said certain function in at least one application state and/or operating state. Furthermore, "at least approximately completely encompassed" is to mean, in this context, in particular that the receiving region is at least approximately completely encompassed by material units and/or elements of the seat device in at least two planes extending perpendicularly with respect to each other. Preferably it is to mean, in particular, that the receiving region is at least approximately completely encompassed by material units and/or elements of the seat device in six spatial directions, starting from a geometrical center of the receiving region. By "at least approximately completely" is to be understood, in this context, in particular by at least 80%, preferably by at least 90% and particularly preferably by at least 95%.

By the implementation of the seat device according to the invention, a particularly advantageous seat device can be provided, which can be used in a variety of ways. In particular, the seat device is advantageously additionally usable as a storage unit. Preferably in particular a supplemental device for a kick scooter can thus be provided, which serves, respectively can be used, both as a seat and as a storage unit. Particularly advantageously, in particular, a space beneath the seat surface is thus advantageously usable, as a result of which in particular an advantageous utilization of space is achievable. In particular in an implementation as a children's kick scooter seat device, an advantageous seat device can thus be provided, which can additionally serve as a storage space for objects, e.g. toys.

It is further proposed that the at least one storage unit comprises at least one base body and at least one opening body that is at least partially movable with respect to the base body, by which opening body the receiving region can be made at least partially accessible. Preferably, by moving the opening body with respect to the base body, a change can be effected from a closed state of the receiving region into an opened state of the receiving region and vice versa. Preferentially the receiving region can also be opened or closed by moving the opening body with respect to the base body while the seat unit is in use, i.e. while a user is sitting on it. Particularly preferably the receiving region is, in a closed state, delimited directly by the base body of the storage unit in at least one spatial direction, and is delimited directly by the opening body of the storage unit in at least one spatial direction. A "base body" is to be understood, in this context, in particular as a body of the storage unit that generates at least a substantial portion of a carrying capacity of the storage unit, preferably of the seat device. Preferably the seat unit of the seat device is at least partially supported via the base body of the storage unit. Herein "at least a substantial portion" is to mean in particular at least 40%, preferably at least 50% and particularly preferentially at least 60% of a total. Furthermore, in this context, an "opening body" is to be understood, in particular, as a body of the storage unit that serves for opening the storage unit. It is preferably to be understood, in particular, as a body by way of which the receiving region of the storage unit can be made at least partially accessible. Particularly preferably it is to be understood, in particular, as a body by moving which with respect to the base body the receiving region can be made at least partially accessible. By "the opening body being at least partially movable with respect to the base body" is to be understood, in this context, in particular that the opening body is movable in a movement radius of at least 10 cm, preferably at least 20 cm, with respect to the base body. The movement can herein be implemented by a relative rotational movement and/or by a relative translational movement and/or by another relative movement that is deemed expedient by a person having ordinary skill in the art. "Made at least partially accessible" is to mean, in this context, in particular that the receiving region is opened in at least one portion, such that objects can be taken out of the receiving region or can be put into the receiving region. Preferably the opened portion of the receiving region is not delimited by material units and/or elements of the seat device. Thus in particular an advantageous storage unit may be provided. In particular, the receiving region can thus be advantageously made accessible.

It is further suggested that the receiving region of the at least one storage unit can be made at least partially accessible by way of a sliding movement of the at least one opening body with respect to the at least one base body. A "sliding movement" is to be understood, in this context, in particular as a movement in which at least one substantial movement component is implemented as a translational movement component. Preferably it is to be understood in particular as a movement that runs at least approximately in a straight line. Herein a "substantial movement component" is to be understood, in particular, as a movement component the movement vector of which has a length amounting to at least 60%, preferably at least 75% and particularly preferably at least 90% of a length of a movement vector of the total movement. As a result of this, in particular an especially easily realizable movement of the opening body can be implemented. Moreover, particularly advantageously the receiving region can thus be made accessible. A particularly simple opening movement can thus be provided, in particular for children.

It is further proposed that the at least one opening body of the at least one storage unit is at least partially implemented by a slide box. Particularly preferentially the receiving region is, in a closed state and in particular in an opened state as well, directly delimited by the opening body of the storage unit in at least five spatial directions. Principally, it would however also be conceivable that the opening body of the storage unit is at least partially implemented by another body that is deemed expedient by a person having ordinary skill in the art, e.g. a flap and/or a lid. A "slide box" is to be understood, in this context, in particular as a box-shaped unit which is in particular completely open at least at an upper side. Preferably it is to be understood as a unit which is at least partially supported, with respect to another unit, e.g. in particular the base body of the storage unit, by means of a rail and/or of another guiding element that is deemed expedient by a person having ordinary skill in the art. As a result of this, a particularly advantageous opening body can be provided. In particular, a particularly easily producible storage unit can be provided. Furthermore, in particular an opening body can thus be provided which is particularly easily loadable. In particular, a falling-out of objects can thus be advantageously avoided.

In particular, it is proposed that the opening body is at least partially made of an at least partially transparent plastic material. Preferably the storage unit, in particular the opening body and/or the base body, comprises a lighting element, by which the opening body can be lighted, in particular from inside. Herein the term "transparent" is to mean, in particular, a characteristic of a permeability for light of a work material or of a structural element, the work material or the structural component being permeable for in particular more than 10%, preferably more than 30% and particularly preferably more than 60% of a spectral range of a visible light. Preferably the spectral range of the visible light has a wavelength $\lambda$ of approximately 350 nm to 800 nm. Particularly preferentially an object that is, at least if viewed along a direction, completely covered by the at least partially transparent opening body, is visible for a user if viewed along a direction intersecting the at least partially transparent opening body and the object. This advantageously allows viewing through the opening body. Preferably viewing is possible in particular through the opening body into the receiving region. Particularly preferably, in particular an advantageous lighting of the seat device can be provided by means of a lighting element. In particular, an optically agreeable lighting from the inside is thus achievable.

It is further proposed that the seat unit is embodied at least partially in a one-part implementation with the at least one storage unit. "In a one-part implementation" is to mean, in particular, at least connected by substance-to-substance bond, e.g. by a welding process, an adhesive process, an injection molding process and/or by another process deemed expedient by a person having ordinary skill in the art, and/or advantageously formed in one piece, e.g. by manufacturing from one casting and/or by manufacturing in a one-component or multi-component injection molding process, and advantageously from a single blank. By two units being embodied "at least partially in a one-part implementation" is to be understood, in particular, that the units comprise at least one, in particular at least two, advantageously at least three shared elements which are part, in particular a functionally relevant part, of both units. As a result of this, a particularly advantageous seat device can be provided, which is in particular especially quickly mountable to and demountable off a kick scooter. Furthermore, in particular a number of structural elements can thus be kept low.

Moreover, it is proposed that the seat unit is embodied at least partially in a one-part implementation with the at least one base body of the at least one storage unit. Preferably the seat unit is embodied completely in a one-part implementation with the at least one base body of the at least one storage unit. As a result of this, a particularly advantageous seat device can be provided, which is in particular especially quickly mountable to and demountable off a kick scooter. Furthermore, in particular a number of structural elements can thus be kept low. In particular, a weight force of a user acting on the seat unit can thus be advantageously deflected onto the base body of the storage unit. As a result of this, in particular an especially stable seat device can be provided.

It is further proposed that the at least one first fastening unit comprises at least one support surface which is in a mounted state provided to support the seat unit and/or the storage unit at least counter to a footboard of the kick scooter. Preferably, via the support surface, in a mounted state and/or in operation in particular a main weight force of the seat device and/or of a user is supported against the footboard of the kick scooter. Furthermore, a "support surface" is to be understood, in this context, in particular as a surface of a device that is provided for abutting on or at a further surface of a further object. Preferably it is to be understood, in particular, as a surface by way of which a device lies in at least one state on a further surface, or on which a further object lies in at least one state. Preferentially it is to be understood, in particular, as a supporting surface. It is preferably to be understood, in particular, as a surface via which a main weight force is supported. A "mounted state" is to be understood, in particular, as a state in which the seat device is completely connected to the kick scooter in the intended manner. Preferably it is to be understood, in particular, as a state for operation. Moreover, in this context, a "footboard" is to be understood in particular as a part of the kick scooter that is, in at least one operating state, provided to supply a resting area for at least one foot of a user. Preferably it is to be understood, in particular, as a part of the kick scooter that has at least one main extension plane extending, in a regular stand of the kick scooter, at least approximately parallel with respect to a ground plane. Herein a "main extension plane" of a component is to be understood, in particular, as a plane parallel to a maximum lateral area of a smallest geometrical rectangular cuboid that just still completely encompasses the part and in particular extends through the center of the rectangular cuboid. A "main weight force" is to mean, in this context, in particular at least 30%, preferably at least 50% and particularly preferably at least 70% of a total weight force. As a result of this, an especially advantageous seat device can be provided. In particular, a particularly simple mounting on a kick scooter is achievable due to the support surface. Further, due to this in particular only a low degree of rigidity of the seat device is required as the seat unit is at least indirectly supported on the footboard. In particular in an implementation as a children's kick scooter seat device thus an advantageously simple and reliable seat device for children can be provided. Moreover, this allows in particular a weight being kept low.

It is further proposed that the seat device comprises at least one second fastening unit, which is releasably connectable to a steering rod of the kick scooter. A "steering rod" is to be understood, in this context, in particular as a rod-shaped structural element comprising at least one handle element for a user. Preferably the steering rod is provided for a force transmission from a handle element onto at least one wheel and/or at least one axle of the kick scooter. Particularly preferably the steering rod is at least partially provided for a transmission of a controlling movement of a user onto at least one wheel and/or at least one axle of the scooter. The steering rod can herein be arranged rigidly as well as movable with respect to a footboard of the kick scooter. As a result of this, an especially advantageous hold of the seat device on the kick scooter can be ensured. In particular a fastening at two points of the vehicle can be thus realized, as a result of which an inadvertent release can be prevented.

It is further proposed that the at least one second fastening unit comprises at least one receiving element which is in a mounted state provided to at least partially engage around the steering rod. A "receiving element" is to be understood, in this context, in particular as an element comprising at least one receiving region for at least partially receiving an element and/or a unit. Preferably it is to be understood as an element that is provided to at least partially engage around an element and/or a unit. Furthermore, "at least partially engage around" is to mean, in this context, in particular that an element engaged-around and/or a unit engaged-around is encompassed by the receiving element in at least one plane in an angle range of at least 90°, preferably of at least 120° and particularly preferably of at least 180°. As a result of this, a constructively simple and easily manufacturable fastening of the seat device at the steering rod of the kick scooter can advantageously be provided. In particular, as a result of this a positive fit in a plurality of directions can already be provided, without special mounting steps being required.

Furthermore it is proposed that the seat device comprises at least one push rod fastening unit for a fastening of an optional push rod. Preferentially the at least one push rod fastening unit is provided for a fastening of further optional add-on modules. Preferably the at least one push rod fastening unit is provided for a toolless fastening of the optional push rod. A "push rod fastening unit" is to be understood, in this context, in particular as a unit via which a push rod can be fastened to the seat device. Preferably it is to be understood, in particular, as a unit via which a push rod can be optionally fastened to the seat device. Moreover, in this context, an "optional push rod" is to be understood, in particular, as a rod by means of which the seat device, in particular the kick scooter with the seat device, can be pushed. Preferentially it is to be understood, in particular, as an optional rod by means of which the seat device, in particular the kick scooter with the seat device, can be guided and/or pushed by a further person differing from a direct user. Especially preferentially it is to be understood, in particular, as an optional rod by means of which, for example, parents can push children on the seat device, in particular on the kick scooter with the seat device. "Toolless" is to mean, in this context, in particular without additional means. This allows establishing and releasing a connection in a particularly easy manner. In particular, due to this no tool is required for establishing and releasing the fastening, such that a connection of this kind can be released and established anywhere. Furthermore, the optional push rod can in particular be mounted to and/or demounted from the push rod fastening unit of the seat device independently from tools or special wrenches. A mounting can be thus also effected by a child without the parents' help, as a result of which a high level of child-friendliness is achievable in this regard as well. An "optional add-on module" is to be understood, in this context, in particular as a module, e.g. an element and/or an add-on, which can be coupled with the seat device optionally. Preferably it is to be understood, in particular, as a module that is in a coupled state provided to supply an additional function but is irrelevant for a basic functioning of the seat device and/or of a kick scooter. Various optional add-on modules are conceivable, which are deemed expedient by a person having ordinary skill in the art, in particular however, these are to be understood as an optional push rod, an optional safety flag and/or an optional safety pennant. It is, however, also conceivable that an optional add-on module is implemented merely as a design element.

By means of the push rod fastening unit, advantageously a push rod can be fastened to the seat device directly. As a result of this a guidance of the seat device is reliably achievable. Preferably a variety of optional add-on modules can thus be fastened to the seat device and hence, in particular also indirectly, at the kick scooter.

Preferentially the at least one push rod fastening unit is embodied at least partially in a one-part implementation with the base body of the storage unit. "In a one-part implementation" is to mean, in particular, connected by substance-to-substance bond, e.g. by a welding process and/or an adhesive process etc. and particularly advantageously moulded-on, e.g. by manufacturing from one casting and/or by manufacturing in a one-component or multi-component injection molding process. This allows a number of structural components being kept advantageously low. Furthermore, an advantageously high stability of the push rod fastening unit is thus achievable.

It is also proposed that the at least one push rod fastening unit comprises at least one functional opening that is provided to receive at least one partial region of the optional push rod. A "functional opening" is to be understood, in this context, in particular as an opening which is provided to receive at least one partial region of the optional push rod in a mounted state. Preferably it is to be understood, in particular, as an opening that at least substantially encompasses the at least one partial region of the optional push rod in a mounted state. Especially preferentially it is to be understood, in particular, as an opening in which the optional push rod engages in a mounted state, or particularly preferentially which is passed through by the optional push rod in a mounted state. As a result of this, an advantageously easy mounting of an optional push rod is achievable. Furthermore, in particular an advantageously multiply usable push rod fastening unit can be provided.

Preferably the functional opening of the at least one push rod fastening unit abuts the receiving region of the storage unit. Preferably the functional opening is opened towards the receiving region. Thus in particular an advantageously compact construction form is achievable. Moreover the optional push rod at least partially protruding into the receiving region in a mounted state is thus achievable.

The invention is furthermore based on an optional push rod for fastening at a seat device. It is proposed that the optional push rod comprises a fastening unit with at least one guiding region, which is provided to be guided through the functional opening of the at least one push rod fastening unit of the seat device, and with at least one securing element, which is provided for a fixation of the fastening unit at the seat device. Preferably the securing element is provided for a back-up securing of the fastening unit at the seat device. Preferentially the securing element is implemented by a securing disk, which can be slid onto an end of the guiding region of the fastening unit to the purpose of a securing. A "fastening unit" is to be understood, in this context, in particular as a unit via which the push rod can be fastened at the seat device. A "guiding region" is to be understood, in this context, in particular as a partial region of the push rod, which is in a mounting of the push rod provided to be guided through the functional opening of the push rod fastening unit. It is preferably to be understood as a partial region of the push rod, which is in a mounted state of the push rod provided to be arranged adjacent to a wall delimiting the functional opening. Especially preferentially the guiding region is in a mounted state of the push rod at least substantially encompassed by a wall delimiting the functional opening. A "securing element" is to be understood, in this context, in particular as an element that is provided to fix the push rod in a mounted state. Preferably it is to be understood as an element that is in a mounted state provided to secure the guiding region in the functional opening against slipping out and/or being pulled out. Especially preferentially the securing element is provided to fix the base body of the push rod on a side of the functional opening that is situated opposite an insert region of the functional opening. Herein an "insert region" is to be understood, in particular, as a region of the functional opening in which the push rod is inserted into the functional opening, in a mounting. As a result of this, an advantageously simple and quick mounting is in particular achievable. Furthermore, as a result of this a reliable fastening of the optional push rod at the seat device is advantageously achievable. Moreover, a release of the push rod can be reliably avoided.

It is also proposed that the at least one securing element is provided to engage into at least one groove of the guiding region for the purpose of fixing the fastening unit at the seat device. Preferentially the groove extends at least substantially perpendicularly with respect to a mounting slide-in direction of the guiding region. As a result of this, advantageously a reliable fastening and securing of the optional push rod at the seat device is achievable. Further a release of the push rod is reliably avoidable. In particular, an advantageous securing of the push rod can be realized.

Preferably the guiding region of the push rod is inserted into the functional opening of the push rod fastening unit of the seat device from a direction that faces away from the receiving region of the storage unit of the seat device. Thus an advantageously easy and quick mounting of the optional push rod at the seat device is achievable.

Preferentially the optional push rod comprises a base body that is at least substantially embodied as a telescope tube. Especially preferentially the base body of the push rod is embodied as a manifold telescope tube. A "telescope tube" is to be understood, in this context, in particular as a tube comprising at least two partial tubes lying coaxially one in the other. Preferably each of the inner partial tubes can be axially shifted or pulled out with respect to the partial tube that is the respectively next bigger one. This allows a non-destructive change in length of the telescope tube. Herein a "manifold telescope tube" is to be understood, in particular, as a telescope tube comprising at least three partial tubes lying coaxially in one another. Preferably the optional push rod has in a retracted state of the base body a length, in particular along a main extension direction, of less than 50 cm, preferably of less than 40 cm and particularly preferably of less than 30 cm. Particularly preferably the optional push rod has in a maximally extended state of the base body a length, in particular along a main extension direction, of at least 50 cm, preferably of at least 60 cm and particularly preferably of at least 70 cm. A "main extension direction" of a structural unit is to be understood, in particular, as a direction extending parallel with respect to a longest lateral edge of a smallest geometrical rectangular cuboid which just still completely encompasses the structural unit. As a result of this, the push rod can be implemented in an advantageously compact manner.

The invention is further based on a seat system with a seat device and with a push rod. It is proposed that the seat device comprises at least one receiving element for at least partially receiving the push rod in a demounted state. A "receiving element" is to be understood, in this context, in particular as an element that is provided to captively receive the push rod in a demounted state. Preferentially it is to be understood as an element via which the push rod can be temporarily fixed and/or stowed at the seat device. Particularly preferably it is to be understood as an element via which the push rod can be temporarily fixed and/or stowed at the seat device in case of non-use. Furthermore, a "demounted state" is to be understood, in this context, in particular as a state of the push rod in which the push rod is demounted from the push rod fastening unit. Preferably it is to be understood, in particular, as a state of the push rod in which the push rod is not in use in particular in an intended function. As a result of this, the push rod can be stowed advantageously quickly and easily in case of non-use. Preferably the push rod can thus be advantageously taken along in a demounted state.

It is moreover proposed that the at least one receiving element is implemented at least partially by a storage unit of the seat device and is provided for receiving at least the base body of the push rod, in a demounted state, in a receiving region of the storage unit. Preferably the push rod can be stowed, in a demounted state, in the opening body of the storage unit of the seat device. As a result of this, the push rod can be stowed advantageously quickly and easily in case of non-use. Furthermore, the push rod can thus be advantageously taken along in the storage unit in a demounted state.

The seat device according to the invention, the optional push rod according to the invention and the system according to the invention are herein not to be restricted to the above-described application and implementation form. In particular, the seat device according to the invention as well as the system according to the invention can comprise, to the purpose of fulfilling a functionality herein described, a number of respective elements, components and units that differs from a number herein mentioned.

DRAWINGS

Further advantages may be gathered from the following description of the drawings. In the drawings five exemplary embodiments of the invention are presented. The drawings, the description and the claims contain a plurality of features in combination. The person having ordinary skill in the art will purposefully also consider the features separately and will further combine them expediently.

Figure 2:
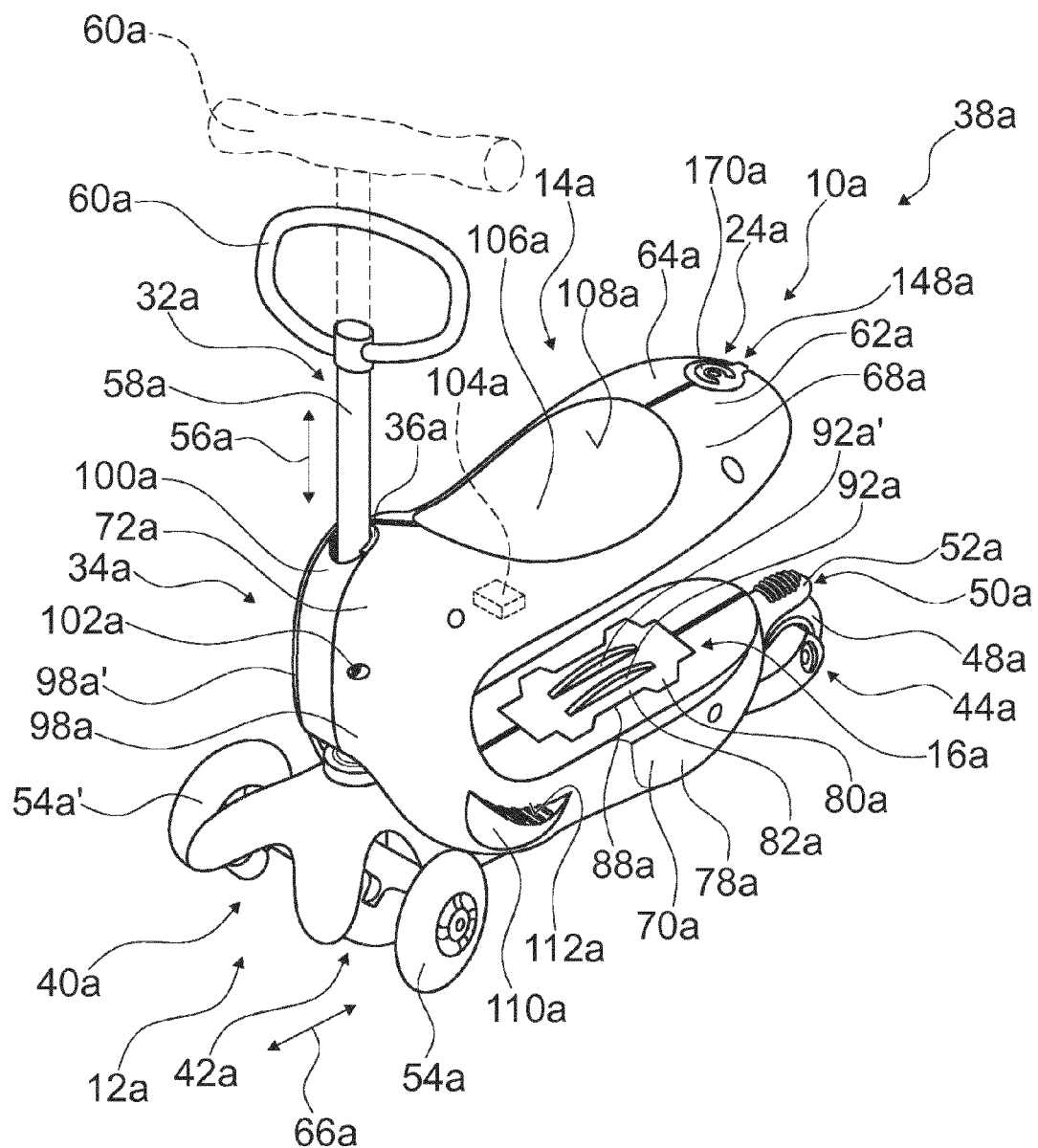
Figure 3:
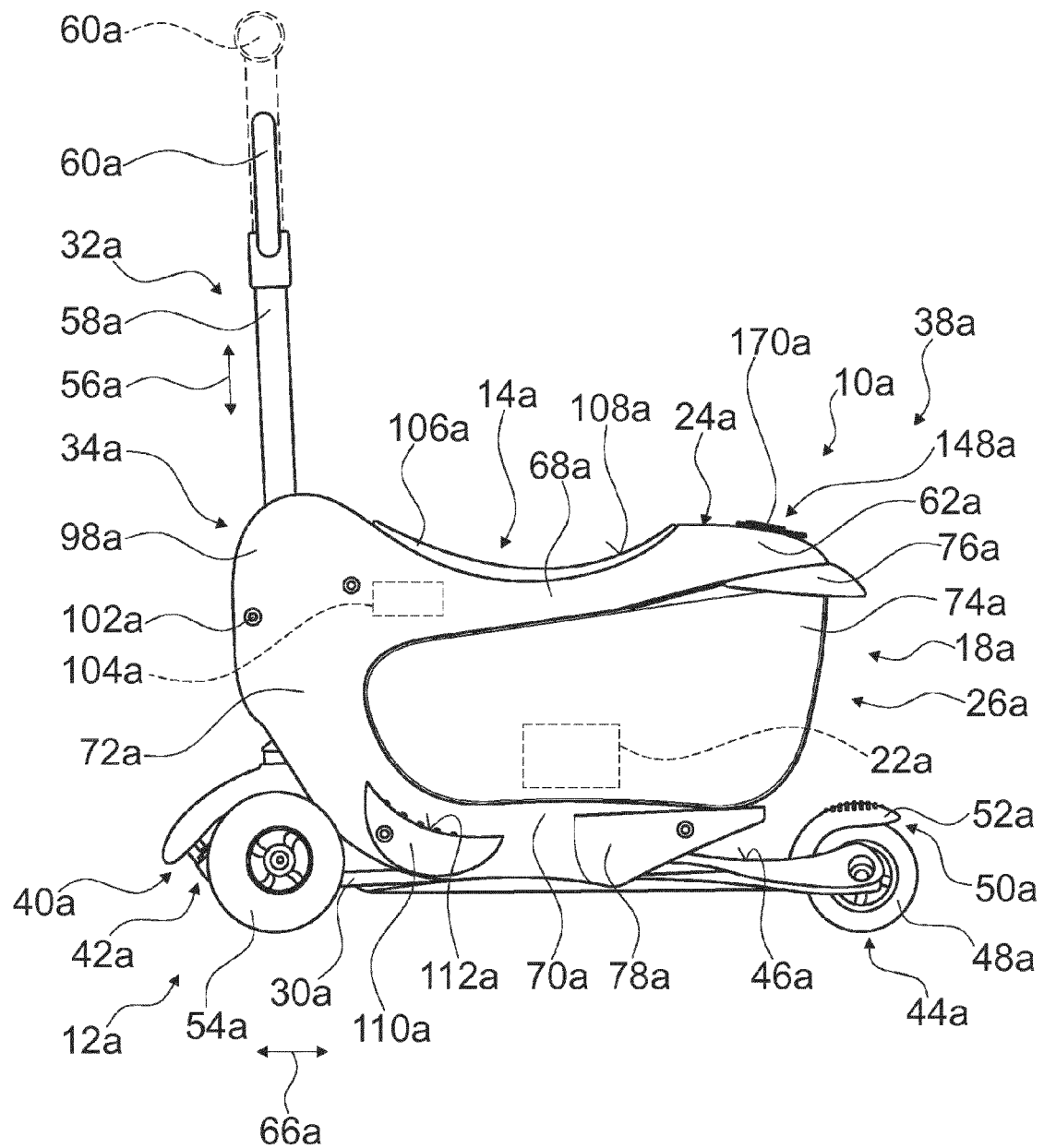
Figure 4:
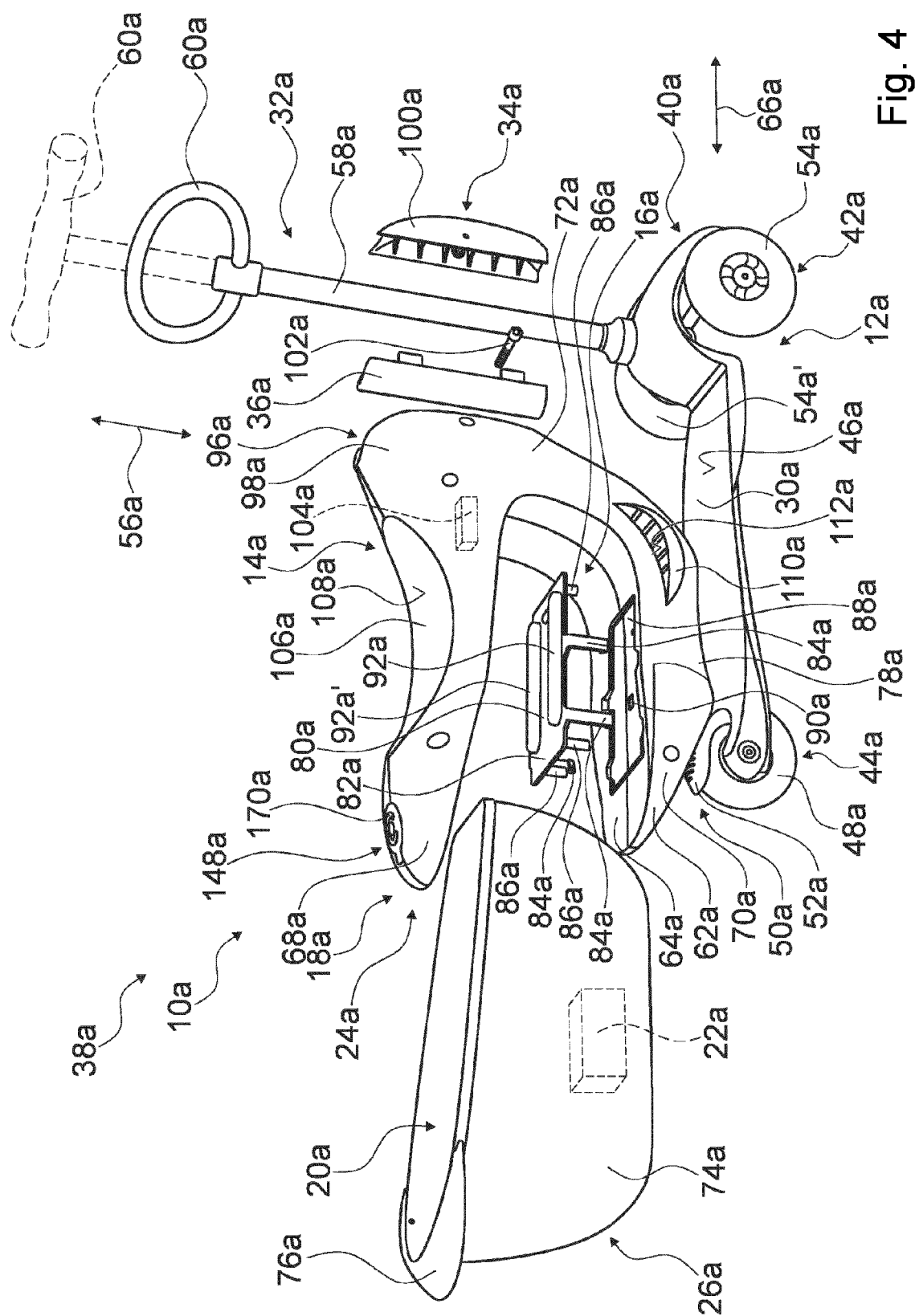
Figure 5:
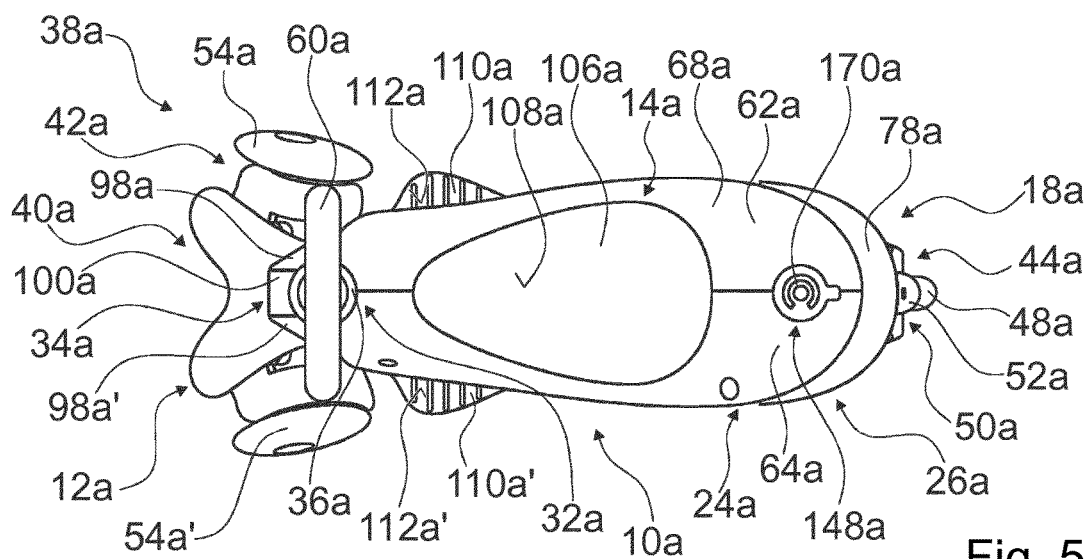
Figure 6:
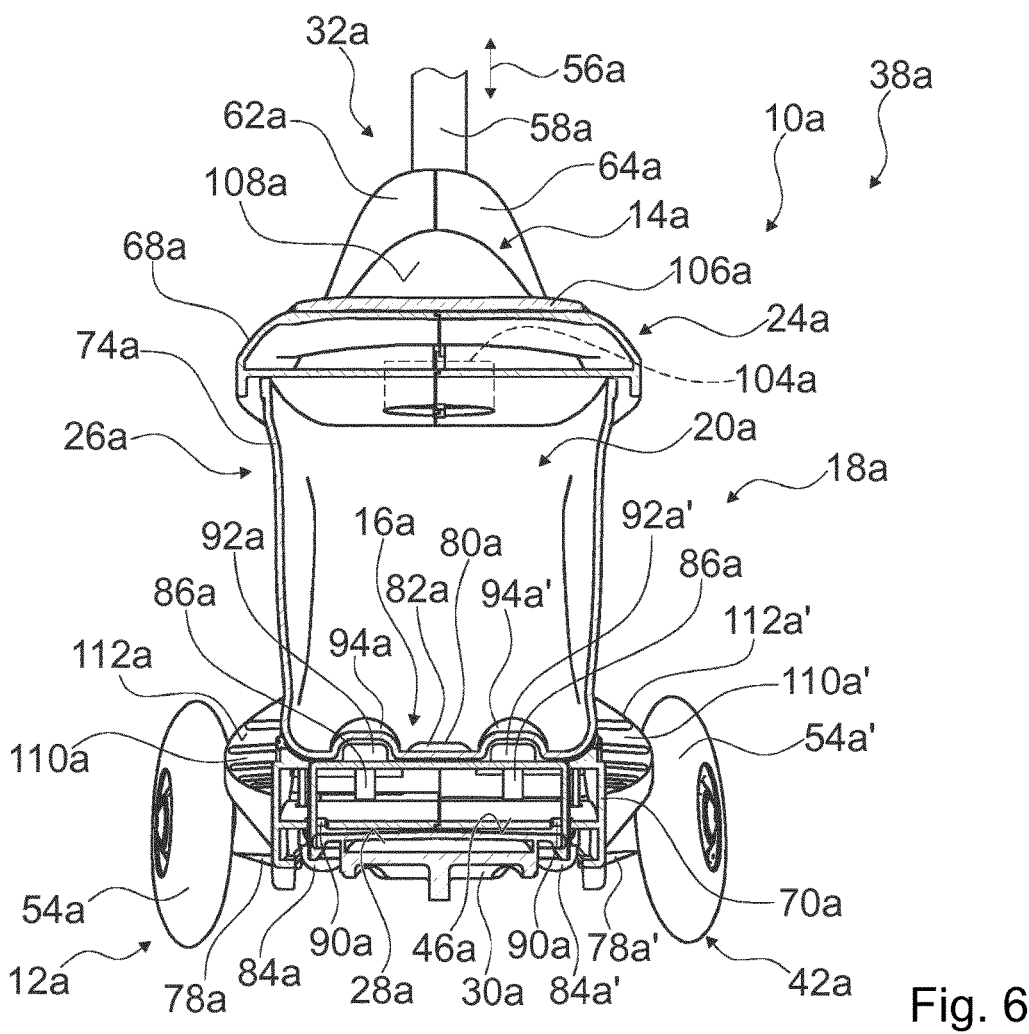
Figure 7:
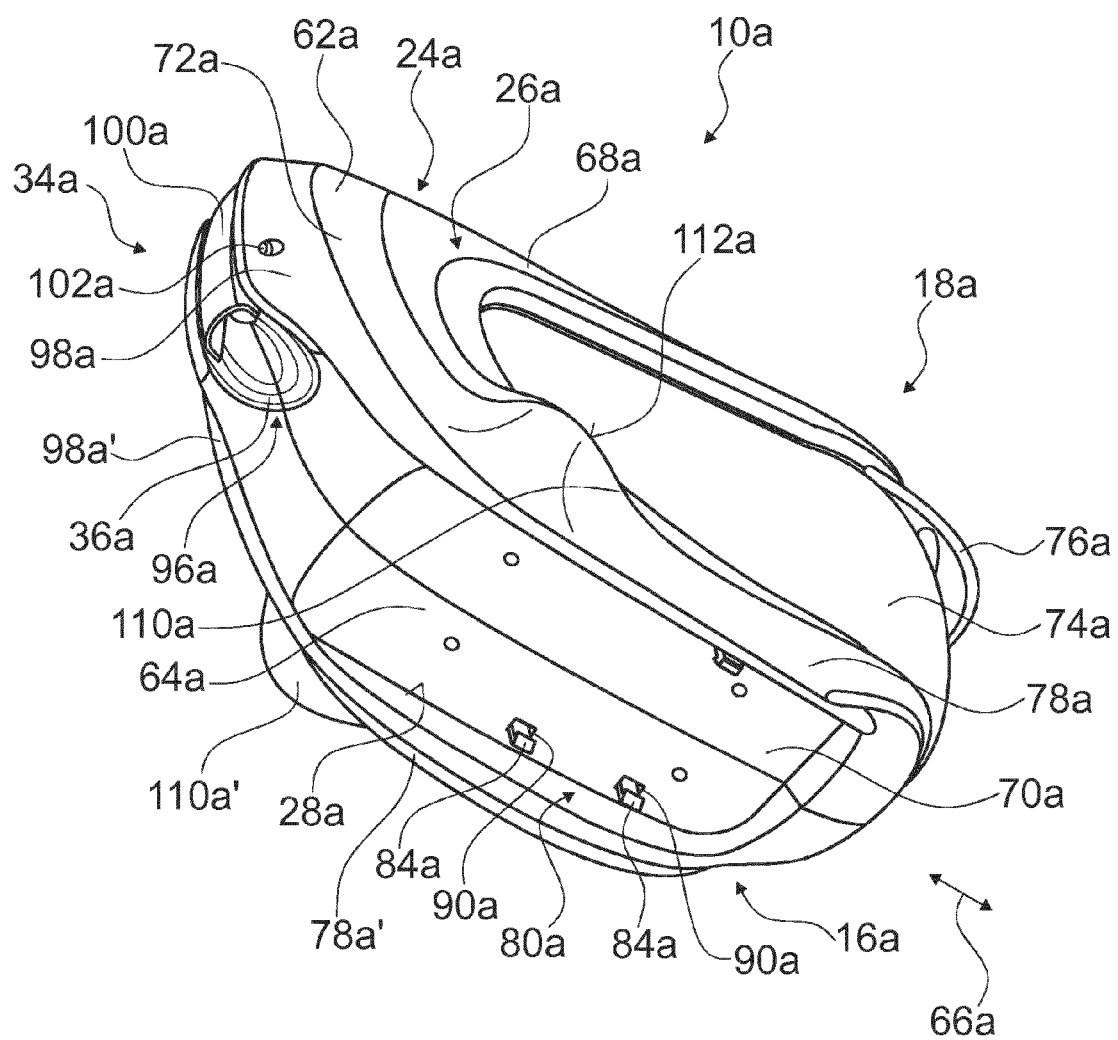
Figure 8:
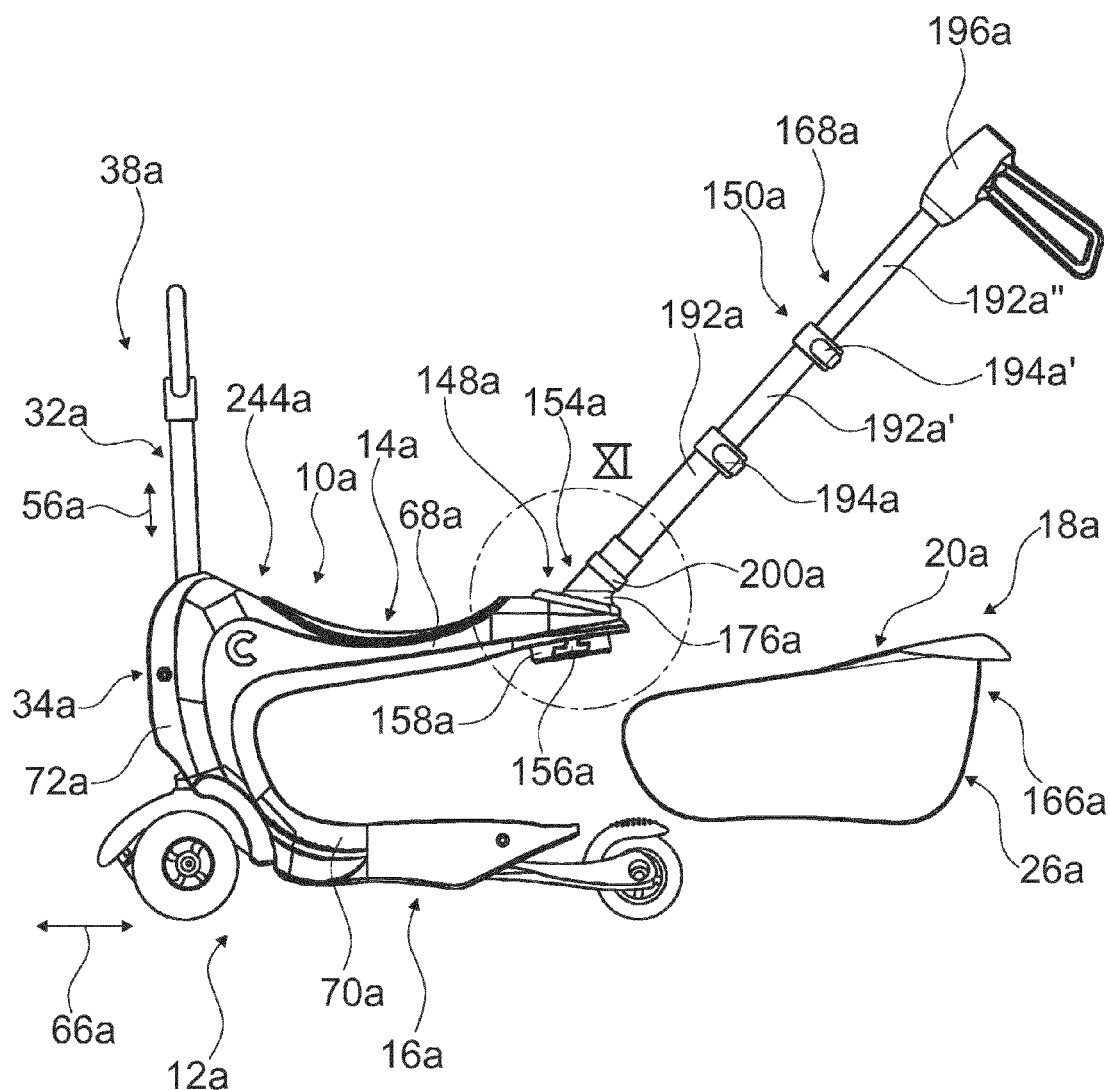
Figure 9:
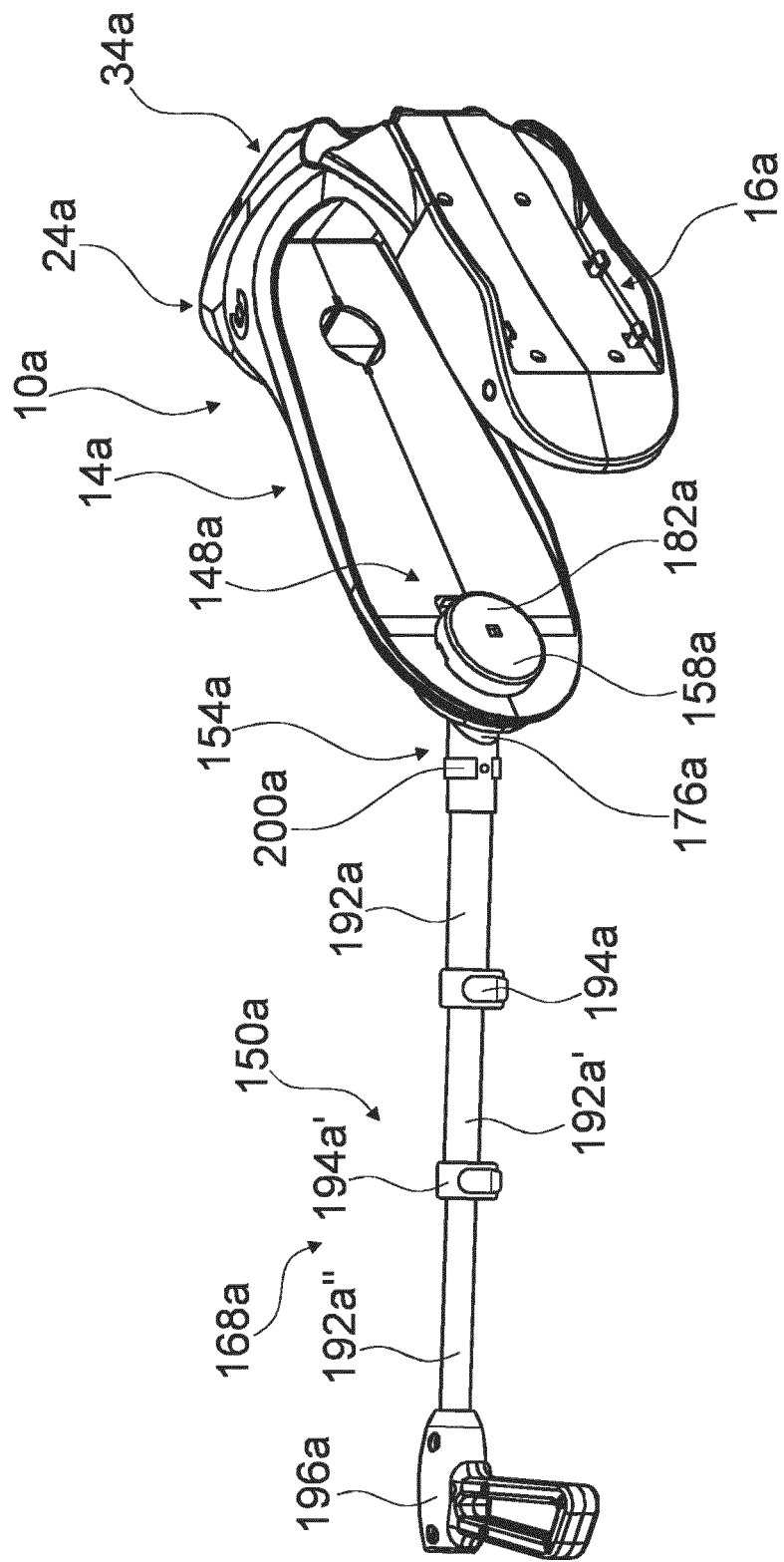
Figure 10:
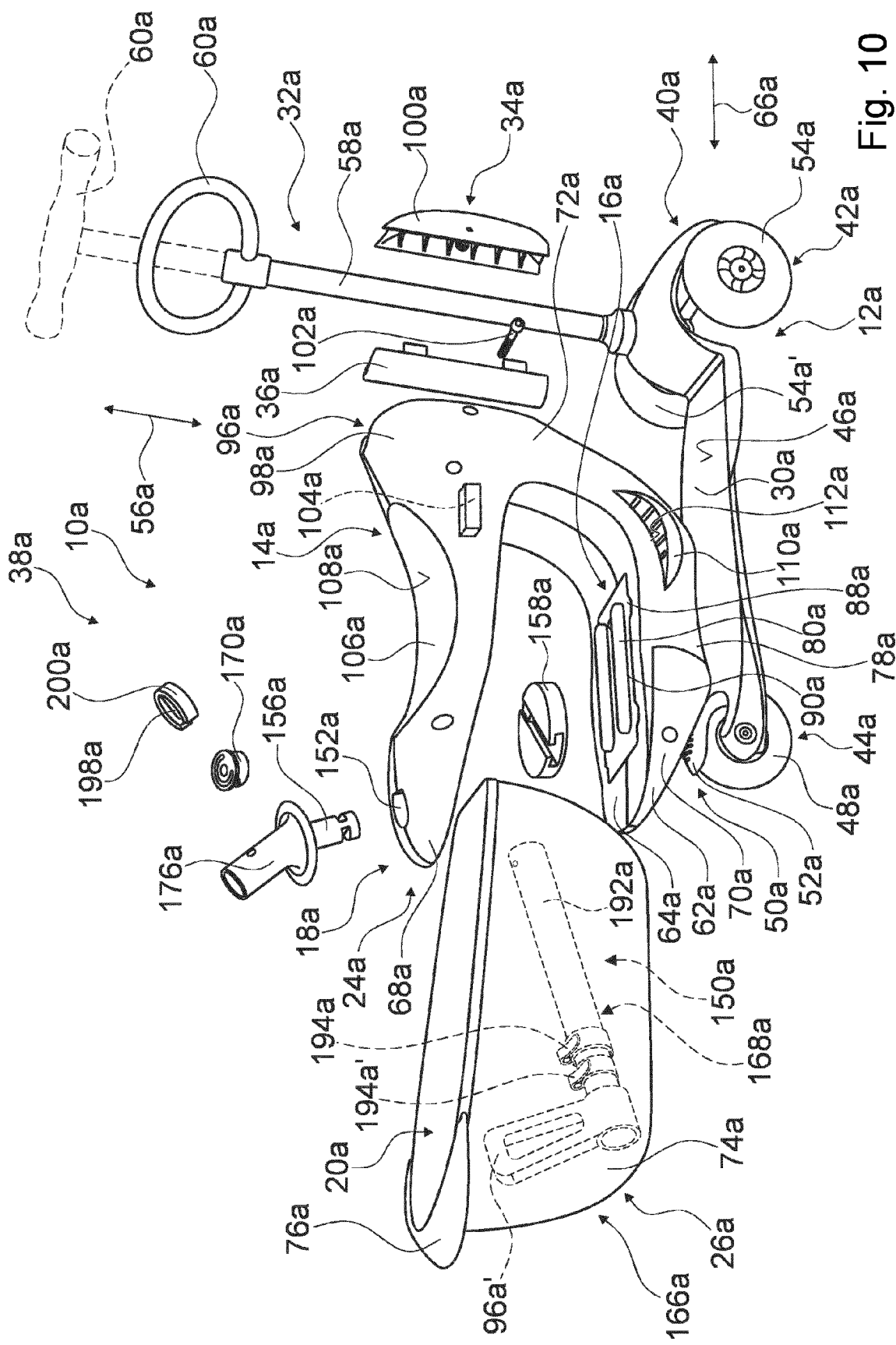
Figure 11:
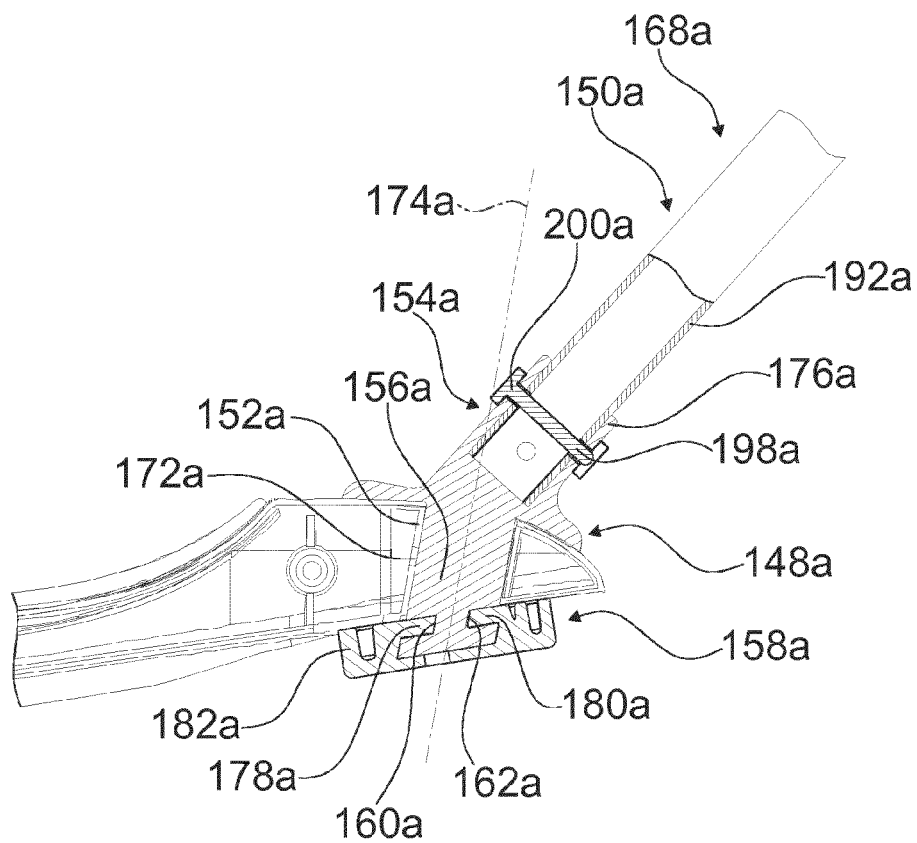
Figure 12:
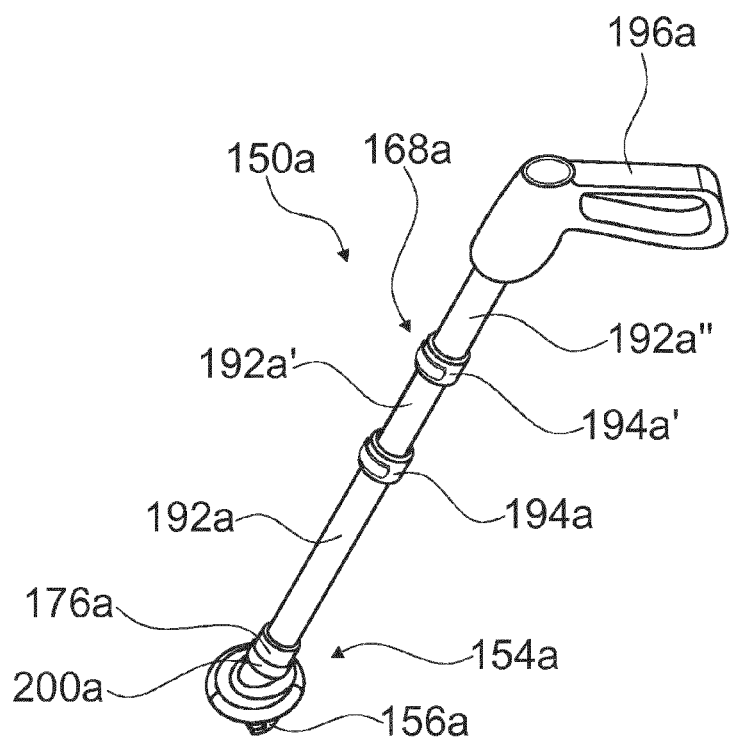
Figure 13:
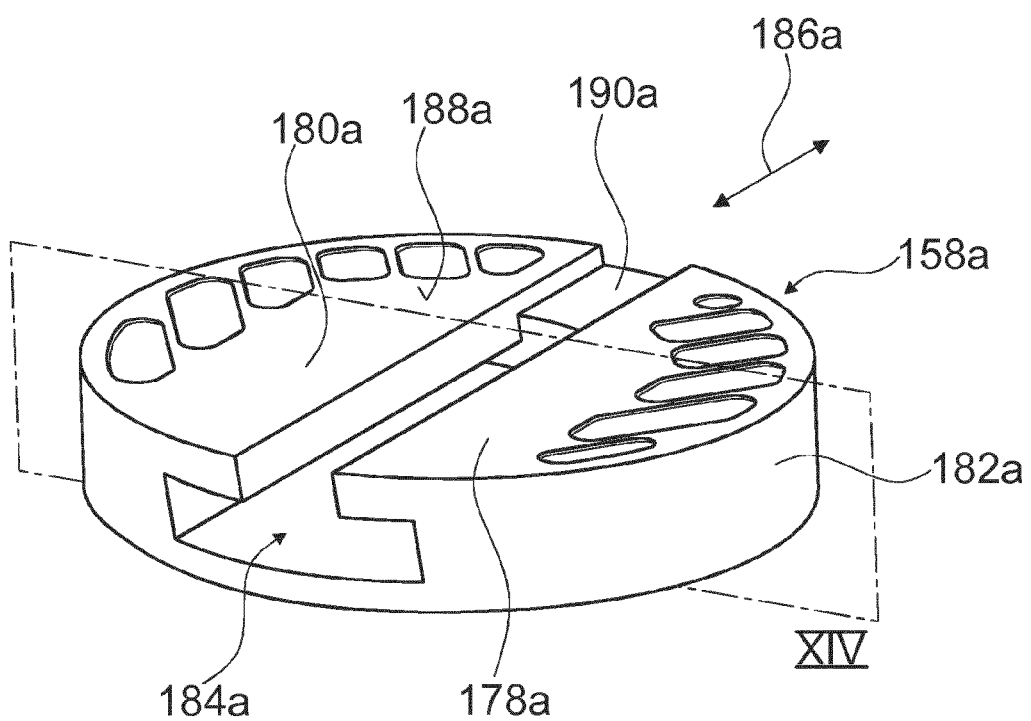
Figure 14:
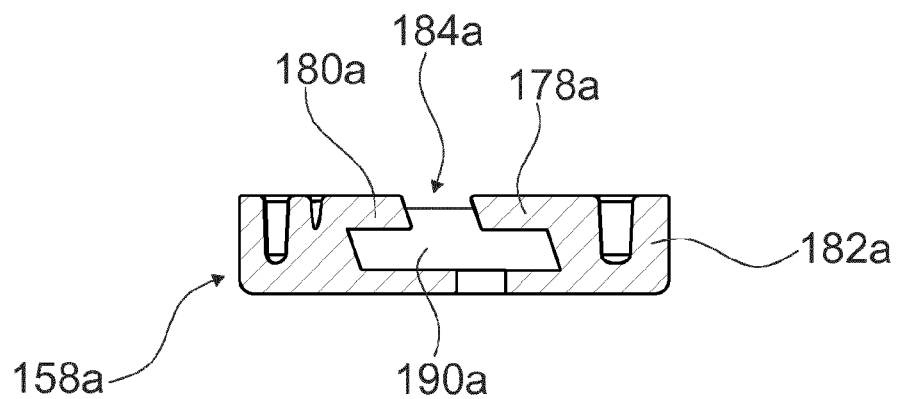
Figure 15:
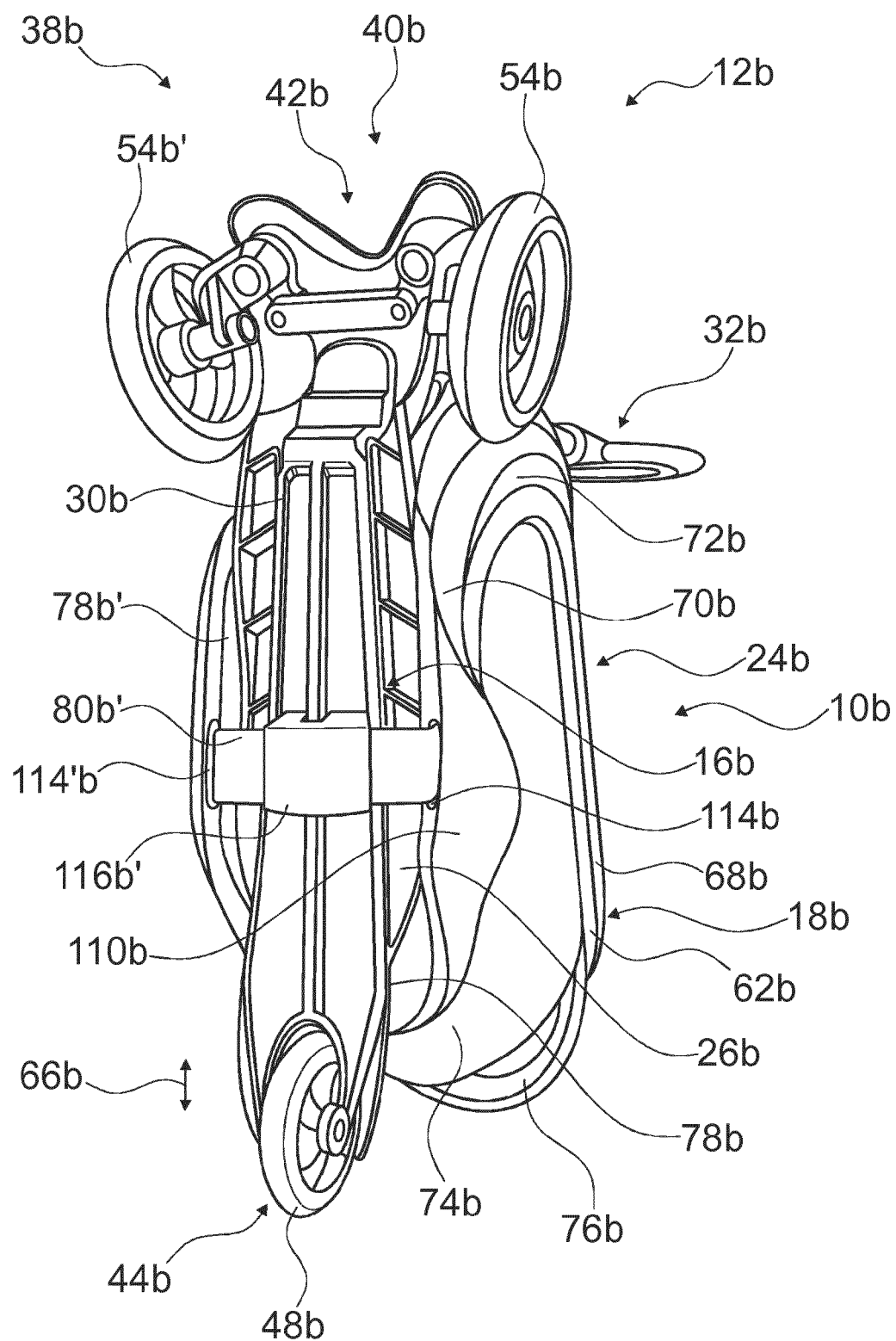
Figure 16:
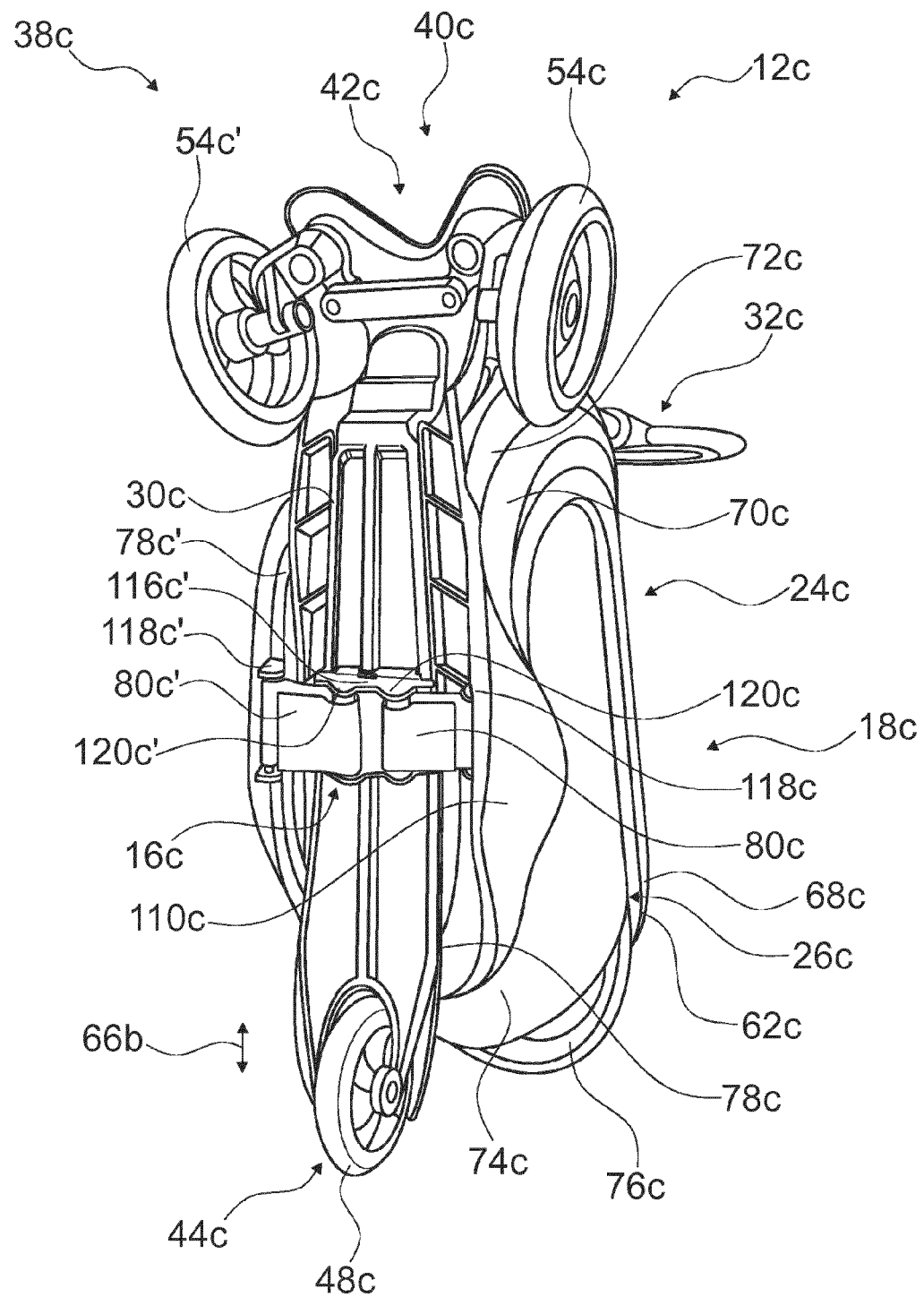
Figure 17:
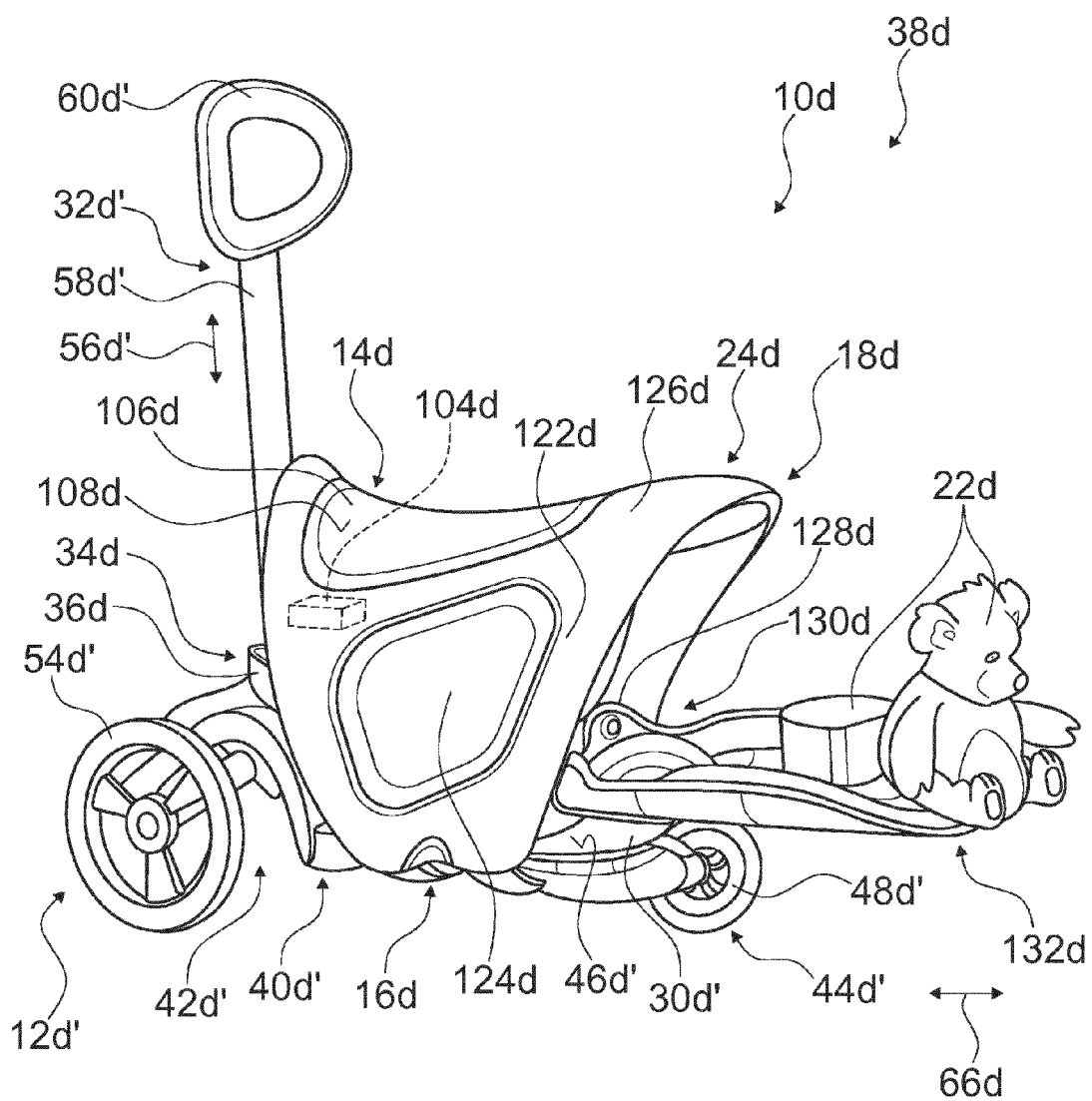
Figure 18:
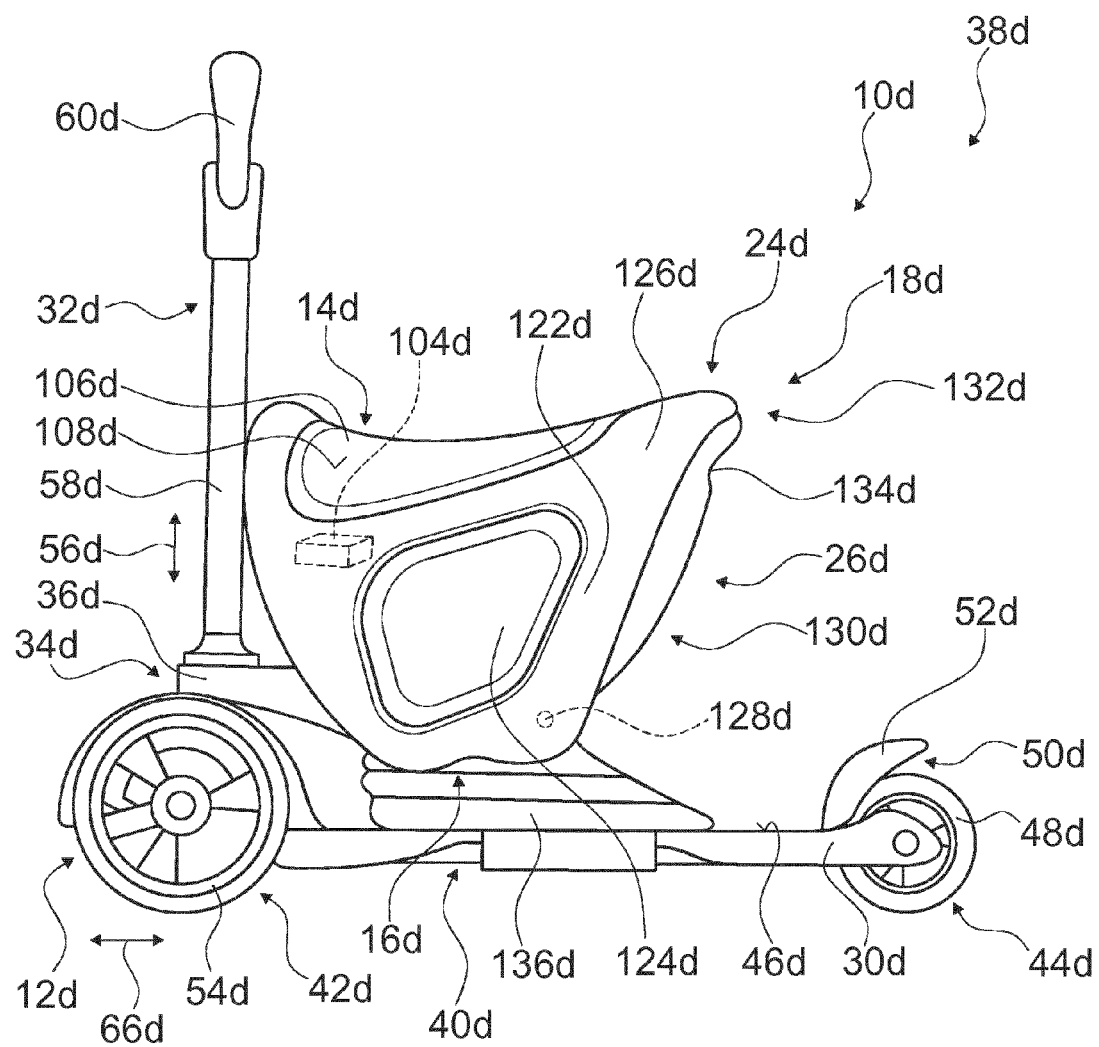
Figure 19:
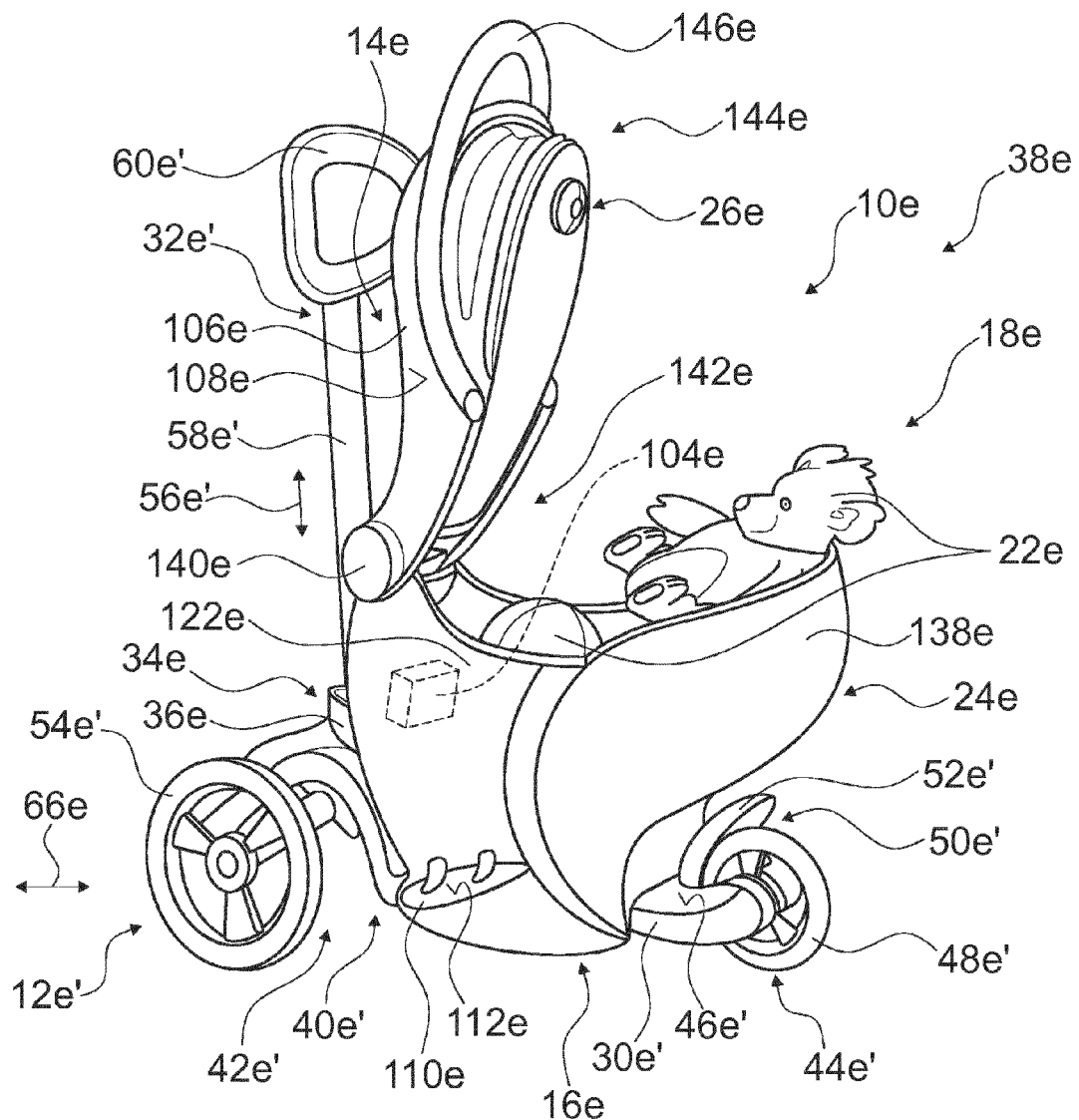
Figure 20:
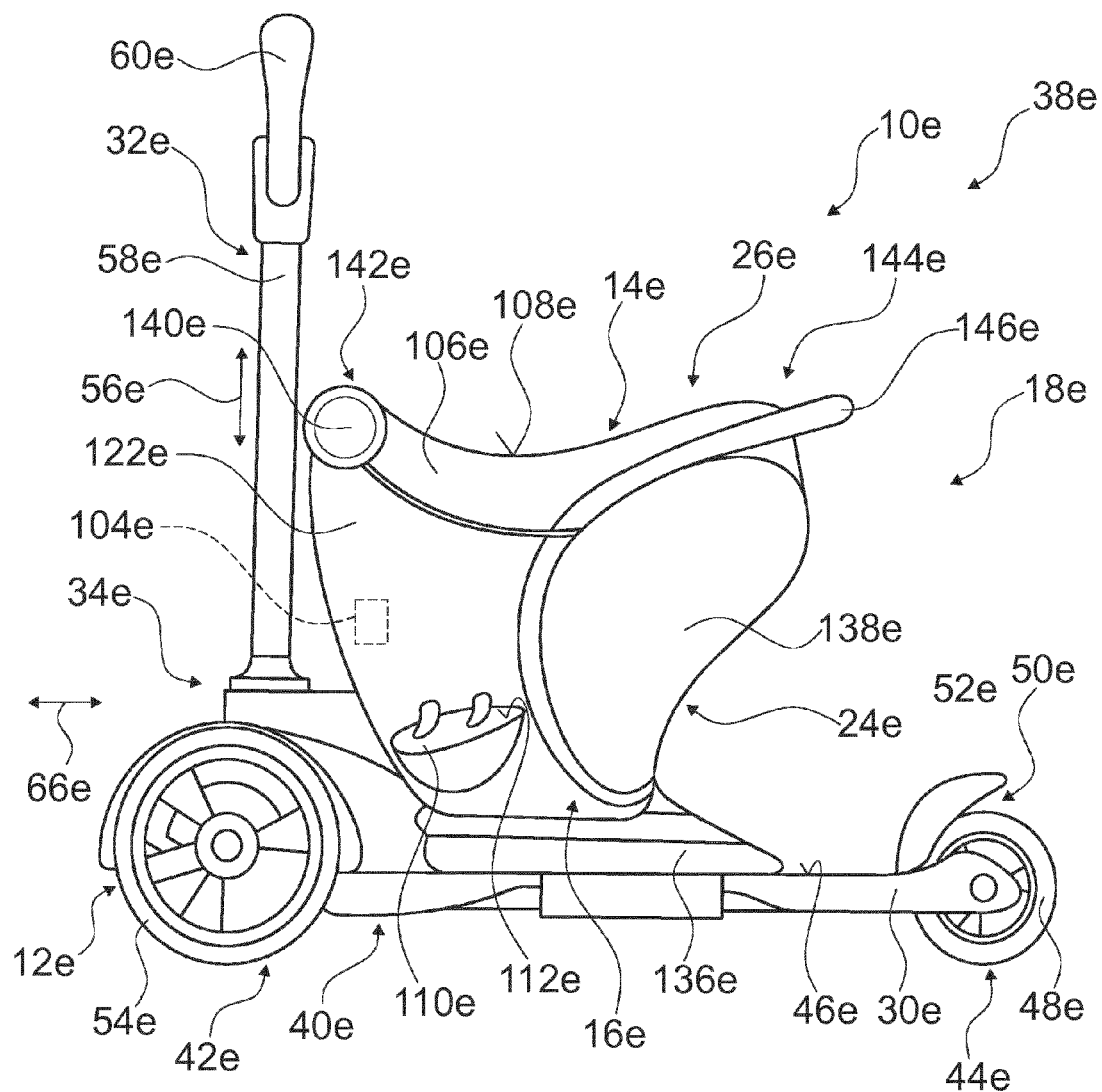

It is shown in:

FIG. 1 a seat device according to the invention with a seat unit, with a second fastening unit and with a storage unit comprising a base body and an opening body, and a kick scooter which the seat device according to the invention is fastened to, in a schematic presentation, FIG. 2 the seat device according to the invention with the seat unit, with the second fastening unit and with the storage unit without the opening body, and the kick scooter, in a schematic presentation, FIG. 3 the seat device according to the invention and the kick scooter, in a schematic presentation in a lateral view, FIG. 4 the seat device according to the invention with the seat unit, with the second fastening unit and with the storage unit, and the kick scooter, in an exploded partial schematic presentation, FIG. 5 the seat device according to the invention and the kick scooter in a schematic presentation in a top view, FIG. 6 the seat device according to the invention and the kick scooter in a schematic presentation in a front view, FIG. 7 the seat device according to the invention with the seat unit, with a first fastening unit, with the second fastening unit and with the storage unit, in a schematic presentation, FIG. 8 the seat device according to the invention with the opening body of the storage unit in an opened state, an optional push rod and the kick scooter, in a schematic presentation, FIG. 9 the seat device according to the invention and the optional push rod, in a schematic presentation, FIG. 10 the seat device according to the invention the optional push rod in a demounted state and the kick scooter, in an exploded partial schematic presentation, FIG. 11 a partial section XI of the seat device according to the invention and of the optional push rod, in a schematic sectional presentation, FIG. 12 the optional push rod in a schematic presentation, FIG. 13 a securing element of the optional push rod, in a schematic presentation, FIG. 14 the securing element of the optional push rod, in a schematic sectional presentation through the section plane XIV, FIG. 15 an alternative seat device according to the invention with a seat unit, with an alternative first fastening unit, with a second fastening unit and with a storage unit, and a kick scooter, in a schematic presentation, FIG. 16 a further alternative seat device according to the invention with a seat unit, with a further alternative first fastening unit, with a second fastening unit and with a storage unit, and a kick scooter, in a schematic presentation, FIG. 17 a further alternative seat device according to the invention and a kick scooter which the seat device according to the invention is fastened to, in a schematic presentation, FIG. 18 the further alternative seat device according to the invention, an adapter device and an alternative kick scooter the seat device according to the invention is fastened to, in a schematic presentation, FIG. 19 a further alternative seat device according to the invention and a kick scooter the seat device according to the invention is fastened to, in a schematic presentation, and FIG. 20 the further alternative seat device according to the invention, an adapter device and an alternative kick scooter the seat device according to the invention is fastened to, in a schematic presentation.

DESCRIPTION OF THE EXEMPLARY EMBODIMENTS

FIG. 1 shows a seat device 10a according to the invention for a kick scooter 12a. The kick scooter 12a and the seat device 10a form a system 38a. The kick scooter 12a is formed by a children's kick scooter. The kick scooter 12a is preferably suitable for children older than 12 months and up to a maximum weight of 20 kg. The kick scooter 12a is formed by a kickboard. The kick scooter 12a has a base body 40a and a steering rod 32a. In turn, the base body 40a has a footboard 30a, a front axle carrier 42a, a rear axle carrier 44a, and a receiving region (not visible in more detail) for receiving the steering rod 32a. The footboard 30a has a bi-convex basic shape. The footboard 30a furthermore has a deck 46a which, in an envisaged standing position of the kick scooter 12a, lies on a side of the footboard 30a that faces away from a base area. The front axle carrier 42a and the rear axle carrier 44a in each case adjoin the footboard 30a at respective opposite ends. By way of an axle (not visible in more detail) the rear axle carrier 44a receives a rear roll 48a of the kick scooter 12a in a rotatable manner. A brake device 50a of the kick scooter 12a is furthermore disposed on the rear axle carrier 44a. The rear roll 48a may be braked by way of the brake device 50a. The brake device 50a has a spring-loaded element 52a which partially protrudes so as to be above the rear roll 48a. The brake device 50a may be activated by exerting pressure, for example by way of a foot of a user, on the spring-loaded element 52a. The front axle carrier 42a has a steering mechanism (not visible in more detail) onto which two front rolls 54a, 54a' of the kick scooter 12a are fastened in a rotatable manner. By way of the steering mechanism (not visible in more detail) the front rolls 54a, 54a' can be tilted in relation to the base body 40a of the kick scooter 12a. Steering of the kick scooter 12a is thus performed by way of weight transfer by the user. On account of steering by means of use of the body by way of weight transfer, the motor skills and the sense of balance may be trained, in particular with children. However, in principle a steering mechanism using a rotatable steering rod for direct steering would also be conceivable. Furthermore, the receiving region (not visible in more detail) for receiving the steering rod 32a is disposed in the region of the front axle carrier 42a. In relation to the main extension direction 56a thereof, the receiving region receives the steering rod 32a so as to be parallel with a normal of a main extension plane of the footboard 30a. The steering rod 32a is composed of a coupling region (not visible in more detail), an elongate rod region 58a, and a handle element 60a. The handle element 60a is configured so as to be annular. The entire kick scooter 12a is mainly composed of plastic. However, in principle it would also be conceivable for the handle element 60a, as is indicated with dashed lines in FIG. 1, to be configured in a rod-like manner and to be composed of two grips which project in a perpendicular manner from the rod region 58a. The grips here project in opposite directions from the rod region 58a, from an end of the rod region 58a which faces away from the coupling region. The steering rod 32a here is configured so as to be T-shaped.

The seat device 10a has a storage unit 18a. The storage unit 18a has a base body 24a and an opening body 26a which is movable in relation to the base body 24a. The base body 24a is configured in two parts. The base body 24a is composed of two half-shells 62a, 64a, which are approximately mirror-inverted and collectively form the base body 24a. The base body 24a is composed of a left half-shell 62a and a right half-shell 64a. The half-shells 62a, 64a are fixedly screwed together by way of screws (not visible in more detail). In principle, it would also be conceivable for the two half-shells 62a, 64a to be adhesively bonded or to be connected in another way which would be appear sensible to a person skilled in the art. The base body 24a, in a mounted state of the seat device 10a, is separated by a plane parallel with a main extension direction 66a and parallel with a main extension direction 56a of the steering rod 32a. The half-shells 62a, 64a adjoin one another in this plane. The base body 24a here is configured so as to be partially hollow. The half-shells 62a, 64a are configured so as to be partially hollow. However, in principle it is also conceivable for the base body 24a to be integrally configured or to be composed of more than two parts, in particular of partial shells. The base body 24a is configured so as to be approximately C-shaped. The base body 24a here has an upper horizontal partial region 68a, a lower horizontal partial region 70a, and a vertical partial region 72a which interconnects the upper horizontal partial region 68a and the lower horizontal partial region 70a. The upper horizontal partial region 68a, the lower horizontal partial region 70a, and the vertical partial region 72a are integrally configured. The upper horizontal partial region 68a has a main extension which runs approximately parallel with the main extension direction 66a of the seat device 10a. The upper horizontal partial region 68a, when viewed along the main extension direction 66a, at an end of the upper horizontal partial region 68a, directly adjoins an upper end of the vertical partial region 72a. The lower horizontal partial region 70a likewise has a main extension which runs approximately parallel with the main extension direction 66a of the seat device 10a. The lower horizontal partial region 70a, when viewed along the main extension direction 66a, at an end of the lower horizontal partial region 70a, directly adjoins a lower end of the vertical partial region 72a. The lower horizontal partial region 70a here, via a rounding, directly transitions into the vertical partial region 72a. Furthermore, the lower horizontal partial region 70a of the base body 24a, in a mounted state of the seat device 10a, bears directly on the footboard 30a of the kick scooter 12a. The vertical partial region 72a of the base body 24a bears directly against the steering rod 32a of the kick scooter 12a.

The opening body 26a of the storage unit 18a is configured so as to be partially box-shaped. The opening body 26a of the storage unit 18a is formed by a drawer. In a closed state, the opening body 26a is disposed between the upper horizontal partial region 68a and the lower horizontal partial region 70a. Furthermore, the opening body 26a bears directly against the vertical partial region 72a. The opening body 26a has a box 74a. The box 74a is configured so as to be approximately rectangular. In a closed state of the opening body 26a, the box 74a is open towards the upper horizontal partial region 68a. The box 74a is composed of a partially transparent plastic. In a closed state, the box 74a is in each case partially encompassed by the upper horizontal partial region 68a, lower horizontal partial region 70a and by the vertical partial region 72a. In a closed state, the box 74a of the opening body 26a in relation to the base body 24a is thus secured by the base body 24a in five spatial directions. Furthermore, the opening body 26a has a handle 76a which is disposed on the box 74a. The handle 76a is disposed on a side of the box 74a which faces away from the vertical partial region 72a, close to the upper horizontal partial region 68a. The handle 76a is disposed on an outer side of the box 74a. The handle 76a is configured so as to be C-shaped and extends from one side of the box 74a to the opposite side. The handle 76a here is connected only by way of its ends to the box 74a. The handle 76a is fixedly connected to the box 74a.

The seat device 10a furthermore has a first fastening unit 16a. The first fastening unit 16a serves for fastening the seat device 10a to the kick scooter 12a. The first fastening unit 16a serves for releasably fastening the seat device 10a to the footboard 30a of the kick scooter 12a. The first fastening unit 16a is configured so as to be partially integral with the base body 24a of the storage unit 18a of the seat device 10a. The first fastening unit 16a has a support surface 28a. In a mounted state, the support surface 28a is provided in order to support the seat unit 14a and the storage unit 18a in relation to the footboard 30a of the kick scooter 12a. In a mounted state of the seat device 10a, the support surface 28a directly bears against the footboard 30a. The support surface 28a is configured so as to be integral with the lower horizontal partial region 70a of the base body 24a. In a direction which is perpendicular to the main extension direction 66a of the seat device 10a, the support surface 28a is delimited by two webs 78a, 78a' which run parallel with the main extension direction 66a of the seat device 10a. The webs 78a, 78a' are likewise configured so as to be integral with the lower horizontal partial region 70a of the base body 24a. The webs 78a, 78a' protrude from the sides of the support surface 28a in a manner which is approximately perpendicular to the support surface 28a.

Furthermore, the first fastening unit 16a has a fastening element 80a. The fastening element 80a has a base plate 82a. The base plate 82a is configured so as to be approximately rectangular. Furthermore, the base plate 82a has a main extension plane which, in a mounted state of the seat device 10a to the kick scooter 12a, extends so as to be parallel with the main extension plane of the footboard 30a. Furthermore, the fastening element 80a has four latch hooks 84a. However, in principle, another number of latch hooks 84a would also be conceivable. The latch hooks 84a are moulded onto two mutually opposite outer edges of the base plate 82a. In each case two of the latch hooks 84a are disposed so as to be spaced apart from one another on a common outer edge. The latch hooks 84a extend in a manner which is substantially perpendicular to the main extension plane of the base plate 82a. Furthermore, the latch hooks 84a protrude from the base plate 82a downwards. The latch hooks 84a, on an end which faces away from the base plate 82a, have in each case one latch catch. The latch catches of the latch hooks 84a in each case point inwards, that is to say in the direction of the latch hooks 84a of the opposite outer edge of the base plate 82a. Furthermore, the fastening element 80a has four protrusions 86a. However, in principle, another number of protrusions 86a would also be conceivable. The protrusions 86a are provided in order to align and position the fastening element 80a, in particular the base plate 82a, in a manner which is partially in relation to the lower horizontal partial region 70a. The protrusions 86a are provided in order to support the base plate 82a in relation to the lower horizontal partial region 70a, in a manner which is perpendicular to the main extension direction 66a. The protrusions 86a are moulded onto a lower side of the base plate 82a of the fastening element 80a. The protrusions 86a protrude downwards from the base plate 82a in manner which is perpendicular to the main extension plane of the base plate 82a. Furthermore, the protrusions 86a are shaped so as to be substantially cylindrical. The lower horizontal partial region 70a here, on an upper side which faces the opening body 26a, has a recess 88a. The recess 88a is incorporated in an outer wall of the lower horizontal partial region 70a which faces the opening body 26a. The recess 88a has an outer contour which approximately corresponds to an outer contour of the base plate 82a of the fastening element 80a. In a mounted state of the seat device 10a, the protrusions 86a extend through a cavity in the lower horizontal partial region 70a up to an inner side of an outer wall which faces the footboard 30a and the outer side of which forms the support surface 28a. Here, the protrusions 86a support the base plate 82a in such a manner that the base plate 82a, in a mounted state of the seat device 10a, is directly disposed in the recess 88a and closes the latter. The base plate 82a is received in the recess 88a in a form-fitting manner. In this position, the base plate 82a is movable only upwards, in a manner which is perpendicular to the main extension plane of the base plate 82a. Furthermore, the lower horizontal partial region 70a, on a lower side which faces the footboard 30a, here has four recesses 90a. The recesses 90a are incorporated in the outer wall of the lower horizontal partial region 70a which faces the footboard 30a. In a mounted state of the seat device 10a, in each case one of the four latch hooks 84a of the fastening element 80a engages through the four recesses 90a. In a mounted state of the seat device 10a on the kick scooter 12a, latch hooks 84a engage through the recesses 90a and by way of their latch catches latch below the footboard 30a of the kick scooter 12a.

The fastening element 80a, on a side of the base plate 82a which faces the opening body 26a, has two guiding webs 92a, 92a'. However, in principle, an alternative number of guiding webs would also be conceivable. The guiding webs 92a, 92a' are in each case formed by a wide web which is moulded on the base plate 82a and extends so as to be parallel with the main extension direction 66a of the seat device 10a. The box 74a of the opening body 26a, on its lower side which faces the lower horizontal partial region 70a, has two guiding recesses 94a, 94a' which match the guiding webs 92a, 92a' of the base body 24a. The guiding recesses 94a, 94a' of the box 74a are moulded into the box 74a and extend so as to be parallel with the main extension direction 66a of the seat device 10a. In an assembled state, such as in the closed state, for example, the guiding webs 92a, 92a' of the fastening element 80a are guided in the guiding recesses 94a, 94a' of the box 74a. The guiding recesses 94a, 94a' of the box 74a extend towards the vertical partial region 72a of the base body 24a, up to an end of the box 74a. The guiding recesses 94a, 94a' of the box 74a are open towards this end. The opening body 26a, when being opened, may be completely pulled out of the base body 24a, such that the guiding webs 92a, 92a' of the fastening element 80a disengage from the guiding recesses 94a, 94a' of the box 74a. The guiding recesses 94a, 94a' here are completely pushed off the guiding webs 92a, 92a' and released therefrom. However, in principle, it would also be conceivable for a blocking element to be disposed on the base body 24a, the fastening element 80*a* and/or the opening body 26*a*, which precludes a complete separation of the opening body 26*a* from the base body 24*a*.

In a closed state of the opening body 26*a*, that is to say in a state in which the opening body 26*a* is completely pushed into the base body 24*a*, the fastening element 80*a* is completely secured in the base body 24*a* and, in a mounted state, also on the kick scooter 12*a*. The fastening element 80*a*, in this state of the seat device 10*a*, by the opening body 26*a* is blocked in relation to an upwards movement from the base body 24*a*. The fastening element 80*a*, in this state, cannot be released. In this way, an in particular coincidental release of the fastening element 80*a* and thus also a partial release of the seat device 10*a* from the kick scooter 12*a* can be avoided. Moreover, in this state the fastening element 80*a* is largely inaccessible to a user.

Furthermore, the seat device 10*a* has a second fastening unit 34*a*. The second fastening unit 34*a* is releasably connectable to the steering rod 32*a* of the kick scooter 12*a*. The second fastening unit 34*a* is configured so as to be partially integral with the base body 24*a* of the storage unit 18*a* of the seat device 10*a*. The second fastening unit 34*a* has a receiving element 36*a*. In a mounted state of the seat device 10*a* on the kick scooter 12*a*, the receiving element 36*a* is provided in order to partially encompass the steering rod 32*a* of the kick scooter 12*a*. In a mounted state of the seat device 10*a* on the kick scooter 12*a*, the receiving element 36*a* is provided in order to partially encompass the rod region 58*a* of the steering rod 32*a*. The receiving element 36*a* comprises a base body which is of approximately semi-cylindrical shape and four guiding protrusions which are moulded onto the base body. The guiding protrusions protrude from the base body on both open sides of the base body. In each case two of the guiding protrusions are disposed on one side. The receiving element 36*a* is received in a receiving region 96*a* of the base body 24*a*. The receiving region 96*a* is disposed in the vertical partial region 72*a* of the base body 24*a*. The receiving region 96*a* is delimited by two webs 98*a*, 98*a*' which run in parallel with one another and which, in a perpendicular manner to the main extension direction 66*a* of the seat device 10*a*, extend in a direction from the lower horizontal partial region 70*a* towards the upper horizontal partial region 68*a*. In a mounted state of the seat device 10*a*, the webs 98*a*, 98*a*' extend so as to be parallel with the main extension direction 56*a* of the steering rod 32*a*. The receiving region 96*a* is formed by a wide gap which extends in a perpendicular manner to the main extension direction 66*a* of the seat device 10*a* and is delimited by the webs 98*a*, 98*a*'. The receiving region 96*a* is composed of a base receiving region and an insertion region. The base receiving region is configured so as to be cylindrical, one cylinder axis running perpendicularly to the main extension direction 66*a* of the seat device 10*a*. The base receiving region is open at both ends towards the insertion region. The base receiving region serves for receiving the receiving element 36*a*. When viewed along the main extension direction 66*a* of the seat device 10*a*, the insertion region directly adjoins the base receiving region in a direction from the seat unit 14*a* towards the second fastening unit 34*a*. Furthermore, the insertion region completely opens the base receiving region in the direction from the seat unit 14*a* towards the second fastening unit 34*a*. In a final mounted state, the rod region 58*a* of the steering rod 32*a* can be inserted into the receiving element 36*a* by way of the insertion region. The second fastening unit 34*a* furthermore has a fastening element 100*a*. The fastening element 100*a* is formed by a hollow body having support ribs. In a mounted state of the seat device 10*a*, the fastening element 100*a* is disposed in the receiving region 96*a*. The fastening element 100*a*, on one outer side, terminates so as to be flush with an outer face of the base body 24*a* of the storage unit 18*a*. In a mounted state of the seat device 10*a*, the steering rod 32*a* is secured by way of the fastening element 100*a* in the receiving element 36*a*. Moreover, in a mounted state of the seat device 10*a*, the receiving region 96*a* is covered by way of the fastening element 100*a*. The fastening element 100*a* here approximately fills the insertion region. For mounting, the fastening element 100*a* is pushed into the insertion region of the receiving region 96*a*. Here, the fastening element 100*a* is pushed over the guiding protrusions of the receiving element 36*a* in such a manner that the guiding protrusions protrude between the support ribs of the fastening element 100*a* and, for positioning the latter, secure it in a partially form-fitting manner. Subsequently, the fastening element 100*a* may be fixedly screwed to the base body 24*a* by way of a screw 102*a*. The screw 102*a* here is screwed through an opening of the first web 98*a*, through an opening of the fastening element 100*a*, and through an opening of the second web 98*a*'.

The first fastening unit 16*a* and the second fastening unit 34*a* are in each case connectable to the kick scooter 12*a* in a tool-less manner and separable from the kick scooter 12*a* in a tool-less manner. Consequently, the seat device 10*a* may be mounted on and dismounted from the kick scooter 12*a* without tools or special wrenches. In particular, mounting may also be performed by a child without help from the parents.

Furthermore, the base body 24*a* has a lighting element 104*a*. The lighting element 104*a* is integrated in the upper horizontal partial region 68*a* of the base body 24*a*. The lighting element 104*a* is provided in order to project a beam in the direction of the opening body 26*a*. The opening body 26*a* may be illuminated from the inside by way of the lighting element 104*a*. The lighting element 104*a* is connected to a switch element (not visible in more detail) by way of which the lighting element 104*a* may be activated and deactivated. The switch element is disposed on an outer side of the base body 24*a* in a manner which is not visible in more detail. However, in principle, it would also be conceivable for the lighting element 104*a* and/or the switch element (not visible in more detail) to be integrated in the opening body 26*a*.

Furthermore, the storage unit 18*a* has a receiving region 20*a*. The receiving region 20*a* is provided for receiving objects 22*a*. Here, only exemplary objects 22*a* are partially illustrated in the figures; however, in principle, other objects which appear meaningful to a user may also be received in the receiving region 20*a*. The receiving region 20*a* preferably serves for receiving toys. The receiving region 20*a* is substantially formed by the box 74*a* of the opening body 26*a*. The receiving region 20*a* is disposed in the box 74*a*. In one state, the receiving region 20*a* is approximately completely enclosed. In a closed state, the receiving region 20*a* is approximately completely enclosed. The receiving region 20*a* is delimited by the box 74*a* in five spatial directions. Furthermore, the receiving region 20*a*, in the sixth spatial direction, is approximately completely delimited by the upper horizontal partial region 68*a* of the base body 24*a*. Therefore, the seat device 10*a* preferably may also be used as a piece of baggage or as a travel case, respectively.

By way of the opening body 26*a* the receiving region 20*a* may be rendered accessible. The receiving region 20*a* of the storage unit 18*a* may be rendered accessible by way of a sliding movement of the opening body 26*a* in relation to the base body 24*a*. The opening body 26*a* here is displaced in such a manner that an opened side of the box 74a of the opening body 26a is moved away from being covered by the upper horizontal partial region 68a of the base body 24a, and that the opened side may be at least partially exposed. To this end, the opening body 26a is displaced from a closed state to an opened state. Here, the receiving region 20a is rendered accessible in such a manner that objects 22a may be loaded into the receiving region 20a or may be removed from the receiving region 20a. In principle, the opening body 26a may also be completely pulled out of the base body 24a in order to provide maximum access to the receiving region 20a. In this state, the opening body 26a may also be used as a simple toy box. On account thereof, a variety of potential uses for the seat device 10a may be enabled.

The seat device 10a furthermore has a seat unit 14a. The seat unit 14a has a seat element 106a with an upholstered seat surface 108a. The seat element 106a is partially composed of an elastomer by way of which the seat surface 108a is soft and upholstered. However, in principle, any other material configuration of the seat element 106a which appears meaningful to a person skilled in the art would also be conceivable. In particular, the seat element 106a in principle may also be filled with air. The seat element 106a has an approximately oval basic shape. However, in principle, another shape which appears meaningful to a person skilled in the art would also be conceivable. The seat unit 14a is configured so as to be partially integral with the storage unit 18a. The seat unit 14a is configured so as to be integral with the base body 24a of the storage unit 18a. The seat unit 14a is adhesively bonded to the base body 24a of the storage unit 18a. The seat element 106a of the seat unit 14a, on an upper side of the upper horizontal partial region 68a, is adhesively bonded to an outer side of the upper horizontal partial region 68a of the base body 24a. The seat element 106a of the seat unit 14a, on an upper side of the upper horizontal partial region 68a, is adhesively bonded into a depression of the upper horizontal partial region 68a of the base body 24a.

When in use, a user sits on the seat surface 108a of the seat unit 14a. When in use, a weight of the user is directed by way of the seat unit 14a to the base body 24a of the storage unit 18a. From the base body 24a of the storage unit 18a the weight is directed to the footboard 30a.

Furthermore, the seat device 10a has two footrests 110a, 110a'. The footrests 110a, 110a' serve for letting a user place his/her feet when the kick scooter 12a is driven. The footrests 110a, 110a' are disposed on the base body 24a. The footrests 110a, 100a' are configured so as to be integral with the base body 24a. The footrests 110a, 110a' are configured so as to be integral with the lower horizontal partial region 70a and the vertical partial region 72a of the base body 24a. The footrests 110a, 110a' are moulded onto a transition region between the lower horizontal partial region 70a and the vertical partial region 72a. The footrests 110a, 110a' are formed by approximately triangular protrusions which in each case protrude on opposite sides from the lower horizontal partial region 70a of the base body 24a, so as to be vertical to the main extension direction 66a of the seat device 10a and so as to be partially parallel with a subsurface. The footrests 110a, 110a' here have in each case one footrest area 112a, 112a' which points upwards in the direction of the upper horizontal partial region 68a. The footrest areas 112a, 112a' here, when viewed along the main extension direction 66a of the seat device 10a, are slightly curved upwards towards the vertical partial region 72a. However, in principle, another shaping and/or arrangement of the footrests 110a, 110a' which appears/appear meaningful to a person skilled in the art would also be conceivable.

Furthermore, the seat device 10a has a push rod fastening unit 148a. The push rod fastening unit 148a is provided for fastening an optional push rod 150a. The push rod fastening unit 148a is provided for a tool-less fastening of the optional push rod 150a. The push rod fastening unit 148a has a functional opening 152a. The functional opening 152a is provided for receiving at least a partial region of the optional push rod 150a. The functional opening 152a is disposed in the base body 24a of the storage unit 18a. The functional opening 152a is disposed at an end which faces away from the vertical partial region 72a in the upper horizontal partial region 68a of the base body 24a. The functional opening 152a completely extends through the upper horizontal partial region 68a of the base body 24a. The functional opening 152a extends in an approximately vertical manner through the horizontal partial region 68a. The functional opening 152a extends from an upper side of the horizontal partial region 68a up to a lower side of the horizontal partial region 68a. The functional opening 152a has an approximately constant cross section. The functional opening 152a has an approximately circular cross section with a flattening. Incorrect mounting, in particular a rotationally incorrect mounting, may be prevented by the flattening. However, in principle, another cross section which appears meaningful to a person skilled in the art would also be conceivable. In a closed state of the opening body 26a, the functional opening 152a is adjacent to a lower end on the receiving region 20a. Towards the top, the functional opening 152a is open towards the environment. The functional opening 152a towards the top may be closed with a lid/cover 170a. The lid/cover 170a, in a closed state, is jammed in a manner which is not visible in more detail in the functional opening 152a. In a closed state, the lid/cover 170a covers the functional opening 152a (FIGS. 8, 10, 11).

The optional push rod 150a is formed by a parental push rod. The push rod 150a optionally may be fastened to the seat device 10a, in order to guide the seat device 10a and the kick scooter 12a. In this way, in particular a person sitting on the seat device 10a, in particular a child, may be pushed. The optional push rod 150a has a fastening unit 154a. The push rod 150a may be fastened to the seat device 10a by way of the fastening unit 154a. The push rod 150a may be fastened to the push rod fastening unit 148a of the seat device 10a by way of the fastening unit 154a. The fastening unit 154a has a guiding region 156a. The guiding region 156a is provided in order to be guided by the functional opening 152a of the push rod fastening unit 148a of the seat device 10a. The guiding region 156a has an approximately cylindrical basic shape. On one side, the basic shape of the guiding region 156a has a flattening 172a. The flattening 172a extends so as to be parallel with a centre axis 174a of the approximately cylindrical basic shape. The guiding region 156a, in a plane which is perpendicular to the centre axis 174a, has a cross section which approximately corresponds to a cross section of the functional opening 152a. The guiding region 156a fits through the functional opening 152a with slight play. At a free end, the guiding region 156a has two grooves 160a, 162a. The grooves 160a, 162a extend so as to be substantially perpendicular to the centre axis 174a. The grooves 160a, 162a are disposed on opposite sides of the basic shape of the guiding region 156a. In a mounted state, one region of the guiding region 156a having the grooves 160a, 162a protrudes from a lower side of the upper horizontal partial region 68a. Furthermore, the fastening unit 154a has a receiving region 176a. The receiving region 176a is provided for receiving a base body 168a of the push rod 150a. The receiving region 176a is disposed on the guiding region 156a on a side of the guiding region 156a which faces away from the grooves 160a, 162a. The receiving region 176a moreover serves as a stop when the guiding region 156a is inserted into the functional opening 152a. To this end, the receiving region 176a has a bearing region which, in a mounted state, bears against a material of the upper horizontal partial region 68a (FIGS. 8, 10, 11).

Furthermore, the optional push rod 150a has a securing element 158a. The securing element 158a is provided for fixing the fastening unit 154a to the seat device 10a. The securing element 158a is provided for additionally securing the fastening unit 154a. The securing element 158a is provided for securing the fastening unit 154a on a lower side against slipping out of the functional opening 152a. For fixing the fastening unit 154a on the seat device 10a, the securing element 158a is provided for engaging in the grooves 160a, 162a of the guiding region 156a. To this end, the securing element 158a is pushed in a perpendicular manner to the centre axis 174a onto an end of the guiding region 156a. Here, webs 178a, 180a of the securing element 158a engage in the grooves 160a, 162a. The securing element 158a has a disc-shaped base body 182a. The securing element 158a is partially composed of a rubber material. However, in principle, it would also be conceivable for the securing element 158a to be composed of a plastic material or another, in particular partially elastic, material which appears meaningful to a person skilled in the art. The securing element 158a has a T-shaped groove 184a. Here, the inwardly protruding webs 178a, 180a, which delimit the T-shaped groove 184a, are formed by webs 178a, 180a which, in a mounted state, are provided to engage in the grooves 160a, 162a. With its main extension direction 186a, the T-shaped groove 184a of the securing element 158a extends so as to be parallel with a main extension plane of the securing element 158a. The T-shaped cross section of the groove 184a lies in a plane which is perpendicular to the main extension plane of the securing element 158a. The T-shaped groove 184a is open towards a circular main extension area 188a of the securing element 158a, which extends so as to be parallel with the main extension plane. The T-shaped groove 184a extends along the main extension direction 186a, across approx. ⅔ of a diameter of the securing element 158a. Here, the T-shaped groove 184a is open towards one end, and is delimited towards another end by way of a stop 190a of the securing element 158a. In this way, the T-shaped groove 184a of the securing element 158a by way of the open end may be pushed onto the end of the guiding region 156a, up to the stop 190a (FIGS. 9, 11, 13, 14)

Furthermore, the optional push rod 150a has a base body 168a. The base body 168a is configured as a telescopic tube. The base body 168a is configured as a multiple telescopic tube. The base body 168a has three partial tubes 192a, 192a', 192a" which are inside one another coaxially. However, in principle, another number of partial tubes which appear meaningful to a person skilled in the art would also be conceivable. A fixing element 194a, by way of which the second partial tube 192a' may be fixed in an arbitrary position in relation to the first partial tube 192a, is disposed at an upper end of the first partial tube 192a. Furthermore, a further fixing element 194a', by way of which the third partial tube 192a" may be fixed in an arbitrary position in relation to the second partial tube 192a', is disposed at an upper end of the second partial tube 192a' which faces away from the fixing element 194a. A handle 196a is disposed on an upper end of the third partial tube 192a" which faces away from the further fixing element 194a'. In a mounted state, the base body 168a is held in the receiving region 176a of the fastening unit 154a at a lower end of the first partial tube 192a which faces away from the fixing element 194a. For fixing, the receiving region 176a which, in a mounted state encompasses the base body 168a, has a bore. The base body 168a, at a lower end of the first partial tube 192a which faces away from the fixing element 194a, has a corresponding bore. In a mounted state, a fixing pin 198a is guided through the bore of the receiving region 176a and the bore of the base body 168a, the fixing pin 198a fixing the base body 168a on the receiving region 176a. The fixing pin 198a is connected in an integral manner to a clamping ring 200a which, in a mounted state, holds the fixing pin 198a in position. To this end, the clamping ring 200a, in a mounted state, encompasses the receiving region 176a (FIGS. 10, 11, 12).

Furthermore, the seat device 10a has a receiving element 166a. The receiving element 166a is provided for receiving the push rod 150a in a dismounted state. In this way, the push rod 150a may advantageously be conjointly transported in a dismounted state. The receiving element 166a is partially formed by the storage unit 18a of the seat device 10a. The receiving element 166a is formed by the opening body 26a. In a dismounted state, the push rod 150a may be stored in the opening body 26a of the storage unit 18a. The base body 182a here may be collapsed to a size which fits into the opening body 26a (FIG. 10).

Four further exemplary embodiments of the invention are shown in FIGS. 15 to 20. The following descriptions are substantially limited to the differences between the exemplary embodiments, wherein reference may be made to the description of the other exemplary embodiments, in particular those of FIGS. 1 to 14, in relation to components, features, and functions which remain the same. In order to differentiate between the exemplary embodiments, the letter a in the reference sings of the exemplary embodiment in FIGS. 1 to 14 is replaced with the letters b and e in the reference signs of the exemplary embodiments of FIGS. 15 to 20. In relation to identically referenced components, in particular with reference to components having identical reference signs, reference may also be made in principle to the drawings and/or the description of the other exemplary embodiments, in particular those of FIGS. 1 to 14.

FIG. 15 shows an alternative seat device 10b according to the invention for a kick scooter 12b. The kick scooter 12b and the seat device 10b form a system 38b. The kick scooter 12b is configured so as to be identical with the kick scooter 12a which is described in the first exemplary embodiment of FIGS. 1 to 14.

The seat device 10b has a seat unit 14b, a storage unit 18b with a base body 24b and an opening body 26b, a first fastening unit 16b and a second fastening unit 34b. The seat device 10b is configured so as to be substantially identical with the seat device 10a which is described in the first exemplary embodiment of FIGS. 1 to 14.

The seat device 10b has the first fastening unit 16b. The first fastening unit 16b serves for fastening the seat device 10b to the kick scooter 12b. The first fastening unit 16b serves for releasably fastening the seat device 10b to the footboard 30b of the kick scooter 12b. The first fastening unit 16b is configured so as to be partially integral with the base body 24b of the storage unit 18b of the seat device 10b. The first fastening unit 16b has a support surface 28b. In a mounted state, the support surface 28b is provided in order to support the seat unit 14b and the storage unit 18b in relation to the footboard 30*b* of the kick scooter 12*b*. In a mounted state of the seat device 10*b*, the support surface 28*b* directly bears against the footboard 30*b*. The support surface 28*b* is configured so as to be integral with the lower horizontal partial region 70*b* of the base body 24*b*. In a direction which is perpendicular to the main extension direction 66*b* of the seat device 10*b*, the support surface 28*b* is delimited by two webs 78*b*, 78*b*' which run parallel with the main extension direction 66*b* of the seat device 10*b*. The webs 78*b*, 78*b*' are likewise configured so as to be integral with the lower horizontal partial region 70*b* of the base body 24*b*. The webs 78*b*, 78*b*' protrude from the sides of the support surface 28*b* in a manner which is approximately perpendicular to the support surface 28*b*.

Furthermore, the first fastening unit 16*b* has a fastening element 80*b*. The fastening element 80*b* is formed by a hook-and-loop fastener. The fastening element 80*b* is formed by a hook-and-loop tape. The fastening element 80*b* is guided through two through-openings 114*b*, 114*b*'. The through-openings 114*b*, 114*b*' in each case extend from one of the webs 78*b*, 78*b*' in a perpendicular manner through the lower horizontal partial region 70*b*, upwards to an upper side of the lower horizontal partial region 70*b*. On an upper side of the lower horizontal partial region 70*b*, the fastening element 80*b* is guided between the lower horizontal partial region 70*b* and a box 74*b* of the storage unit 18*b*. On a lower side of the lower horizontal partial region 70*b*, the fastening element 80*b* is guided between the two webs 78*b*, 78*b*', wherein a hook-and-loop connection of the fastening element 80*b* between the two webs 78*b*, 78*b*' is implemented so as to be separable. In principle, the region of the hook-and-loop connection may also be displaced to another region. In a closed state of the hook-and-loop connection, the fastening element 80*b* results in an inherently closed tape. Furthermore, the first fastening unit 16*b* has a press body 116*b*. On one side, the press body 116*b* has a two-dimensional contour which forms a congruent counter-contour to a two-dimensional contour of a lower side of the footboard 30*b*. The fastening element 80*b* (in a manner not visible in more detail) is guided through the press body 116*b*. In a mounted state of the seat device 10*b*, the press body 116*b*, by way of the fastening element 80*b*, is pushed with the two-dimensional contour against the footboard 30*b*. On account thereof, tight retention of the seat device 10*b* may be ensured.

On a side of the lower horizontal partial region 70*b* which faces the opening body 26*b*, the base body 24*b* has two guiding rails (not visible in more detail). However, in principle, an alternative number of guiding rails would also be conceivable. The guiding rails in each case are composed of two webs which extend so as to be parallel with the main extension direction 66*b* of the seat device 10*b*. A box 74*b* of the opening body 26*b*, on its lower side which faces the lower horizontal partial region 70*b*, has two guiding webs (not visible in more detail) which match the guiding rails (not visible in more detail) of the base body 24*b*. The guiding webs of the box 74*b* extend so as to be parallel with the main extension direction 66*b* of the seat device 10*b*. In an assembled state, such as the closed state, for example, the guiding webs of the box 74*b* are guided in the guiding rails of the base body 24*b*. When being opened, the opening body 26*b* may also be completely pulled out of the base body 24*b*, such that the guiding webs disengage from the guiding rails. The guiding webs here are completely pushed off the guiding rails and released therefrom. In principle, it would also be conceivable for a blocking element to be additionally disposed on the base body 24*b* and/or the opening body 26*b*, which precludes a complete separation of the opening body 26*b* from the base body 24*b*. However, in principle, another guiding which appears meaningful to a person skilled in the art would also be conceivable, in particular a guiding such as is described in the first exemplary embodiment of FIGS. 1 to 14, for example.

FIG. 16 shows a further alternative seat device 10*c* according to the invention for a kick scooter 12*c*. The kick scooter 12*c* and the seat device 10*c* form a system 38*c*. The kick scooter 12*c* is configured so as to be identical with the kick scooter 12*a* which is described in the first exemplary embodiment of FIGS. 1 to 14.

The seat device 10*c* has a seat unit 14*c*, a storage unit 18*c*, a first fastening unit 16*c*, and a second fastening unit 34*c*. Except for a design embodiment of the first fastening unit 16*c*, the seat device 10*c* is configured so as to be identical with the seat device 10*a* which is described in the first exemplary embodiment of FIGS. 1 to 14.

The seat device 10*c* has the first fastening unit 16*c*. The first fastening unit 16*c* serves for fastening the seat device 10*c* to the kick scooter 12*c*. The first fastening unit 16*c* serves for releasably fastening the seat device 10*c* to a footboard 30*c* of the kick scooter 12*c*. The first fastening unit 16*c* is configured so as to be partially integral with the base body 24*c* of the storage unit 18*c* of the seat device 10*c*. The first fastening unit 16*c* has a support surface 28*c*. In a mounted state, the support surface 28*c* is provided in order to support the seat unit 14*c* and the storage unit 18*c* in relation to the footboard 30*c* of the kick scooter 12*c*. In a mounted state of the seat device 10*c*, the support surface 28*c* directly bears against the footboard 30*c*. The support surface 28*c* is configured so as to be integral with the lower horizontal partial region 70*c* of the base body 24*c*. In a direction which is perpendicular to the main extension direction 66*c* of the seat device 10*c*, the support surface 28*c* is delimited by two webs 78*c*, 78*c*' which run parallel with the main extension direction 66*c* of the seat device 10*c*. The webs 78*c*, 78*c*' are likewise configured so as to be integral with the lower horizontal partial region 70*c* of the base body 24*c*. The webs 78*c*, 78*c*' protrude from the sides of the support surface 28*c* in a manner which is approximately perpendicular to the support surface 28*c*.

Furthermore, the first fastening unit 16*c* has two fastening elements 80*c*, 80*c*'. The fastening elements 80*c*, 80*c*' are in each case formed by one hook-and-loop tape. The fastening elements 80*c*, 80*c*' have in each case one barbed-hook region and one loop region. Each of the fastening elements 80*c*, 80*c*' is in each case fixedly disposed on one of the webs 78*c*, 78*c*'. To this end, the webs 78*c*, 78*c*' have in each case one bracket 118*c*, 118*c*'. The brackets 118*c*, 118*c*' are in each case fixedly connected at both ends to a base body of the associated web 78*c*, 78*c*'. The fastening elements 80*c*, 80*c*' are in each case guided through between the bracket 118*c*, 118*c*' and the base body of the associated web 78*c*, 78*c*' and stitched to the bracket 118*c*, 118*c*' so as to enclose the latter. However, in principle, another form of fastening the fastening elements 80*c*, 80*c*' to the webs 78*c*, 78*c*' which appears meaningful to a person skilled in the art would also be conceivable. Furthermore, the first fastening unit 16*c* has a press body 116*c*. On one side, the press body 116*c* has a two-dimensional contour which forms a congruent counter-contour to a two-dimensional contour of a lower side of the footboard 30*c*. The press body 116*c* has two brackets 120*c*, 120*c*' which are disposed on a side which faces away from the two-dimensional contour. For mounting, the press body 116*c* may be placed onto a lower side of the footboard 30*c*. Subsequently, the fastening elements 80*c*, 80*c*' are guided through below the brackets 120c, 120c' and then connected to themselves again by way of a hook-and-loop connection. In this way, an advantageous fastening of the seat device 10c to the kick scooter 12c may be achieved. In particular, the press body 116c may advantageously be centred on the footboard 30c in this way. On account thereof, tight retention of the seat device 10c may be ensured.

FIG. 17 shows a further alternative seat device 10d according to the invention for a kick scooter 12d'. The kick scooter 12d' and the seat device 10d form a system 38d. With the exception of a different size, the kick scooter 12d' is configured so as to be approximately identical with the kick scooter 12a which is described in the first exemplary embodiment of FIGS. 1 to 14. In particular, the kick scooter 12d' in comparison with the kick scooter 12a which has been described in the first exemplary embodiment of FIGS. 1 to 14 has the same components with the same functions. Accordingly, the description of the kick scooter 12a of the first exemplary embodiment of FIGS. 1 to 14 may also apply in particular to the kick scooter 12d'.

The seat device 10d has a seat unit 14d, a storage unit 18d, a first fastening unit 16d, and a second fastening unit 34d.

The seat device 10d has a storage unit 18d. The storage unit 18d has a base body 24d and an opening body 26d which is movable in relation to the base body 24d. The base body 24d forms a cavity. The base body 24d is configured so as to be approximately box-shaped. The base body 24d approximately has the shape of a prism having a trapezoidal footprint, wherein the trapezoidal footprint is formed by a lateral area 122d, 122d' of the base body 24d. The base body 24d has two trapezoidal lateral areas 122d, 122d'. Here, a long side of the trapeze is located on a side which faces away from a footboard 30d. One inspection glass 124d, of which only one is visible, is in each case located in the lateral areas 122d, 122d'. The inspection glass 124d is composed of a transparent material. On account thereof, it is possible to look into a cavity of the base body 24d, in particular by way of the inspection glasses 124d. Furthermore, the base body 24d has a material upper side 126d, a material front side (not visible in more detail), and a material lower side (not visible in more detail). A rear side of the base body 24d is opened. In a mounted state of the seat device 10d, the lower side (not visible in more detail) of the base body 24d directly bears onto the footboard 30d of the kick scooter 12d'. In a mounted state of the seat device 10d, the front side (not visible in more detail) of the base body 24d faces a steering rod 32d of the kick scooter 12d'.

The opening body 26d is disposed on the opened rear side of the base body 24d. The opening body 26d is formed by a flap. In a closed state, the opening body 26d closes the rear side of the base body 24d and locks the latter. The opening body 26d is mounted so as to be movable in relation to the base body 24d. The opening body 26d is movable in relation to the base body 24d by way of a rotational axis 128d. In the case of the base body 24d, the rotational axis 128d is defined between the lateral areas 122d, close to the rear side of the base body 24d and close to the lower side of the base body 24d. In the case of the opening body 26d, the rotational axis 128d is disposed in a lower end region 130d. The rotational axis 128d is implemented by way of two pins on the lateral areas 122d of the base body 24d, and by way of two recesses on the opening body 26d. However, in principle, another implementation and/or arrangement of the rotational axis 128d which appear/appears meaningful to a person skilled in the art would also be conceivable. A latch device (not visible in more detail) is disposed on an inner side in an upper end region 132d of the opening body 26d, which is opposite the lower end region 130d of the opening body 26d. In a closed state of the opening body 26d, the latch device (not visible in more detail) is provided so as to engage in the upper side 126d of the base body 24d. Furthermore, the opening body 26d has a handle recess 134d. The opening body 26d may be pulled out of the latch feature and opened by way of the handle recess 134d. The opening body 26d is substantially composed of a partially transparent plastic material.

Furthermore, the base body 24d has a lighting element 104d. The lighting element 104d is integrated in the cavity of the base body 24d. The lighting element 104d is provided in order to illuminate the cavity. From there, the light in the cavity may project in a beam via the inspection glasses 124d and the transparent opening body 26d to the outside. By way of the lighting element 104d, the base body 24d may be illuminated from the inside. The lighting element 104d is connected to a switch element (not visible in more detail) by way of which the lighting element 104d may be activated and deactivated. The switch element is disposed on an outer side of the base body 24d in a manner which is not visible in more detail. However, in principle, it would also be conceivable for the lighting element 104d and/or the switch element (not visible in more detail) to be integrated in the opening body 26d.

Furthermore, the storage unit 18d has a receiving region 20d. The receiving region 20d is provided for receiving objects 22d. Here, only exemplary objects 22d are illustrated in the figures; however, in principle, other objects which appear meaningful to a user may also be received in the receiving region 20d. The receiving region 20d is substantially delimited by the base body 24d. The receiving region 20d is formed by the cavity of the base body 24d. In one state, the receiving region 20d is approximately completely enclosed. In a closed state, the receiving region 20d is approximately completely enclosed. The receiving region 20d is delimited in five spatial directions by the base body 24d. Furthermore, the receiving region 20d, in the sixth spatial direction, is approximately completely delimited by the opening body 26d. The receiving region 20d may be rendered accessible by way of the opening body 26d. To this end, the opening body 26d, by way of the handle recess 134d, is pull backwards and released from its latch feature. The opening body 26d may now be folded back by way of the rotational axis 128d. The opening body 26d here is moved from a closed state to an opened state.

The seat device 10d furthermore has the seat unit 14d. The seat unit 14d has a seat element 106d with an upholstered seat surface 108d. The seat element 106d is partially composed of an elastomer by way of which the seat surface 108d is soft and upholstered. However, in principle, another material configuration of the seat element 106d which appears meaningful to a person skilled in the art would also be conceivable. The seat element 106d has an approximately oval basic shape. However, in principle, another shape which appears meaningful to a person skilled in the art would also be conceivable. The seat unit 14d is configured so as to be partially integral with the storage unit 18d. The seat unit 14d is configured so as to be integral with the base body 24d of the storage unit 18d. The seat unit 14d is adhesively bonded to the base body 24d of the storage unit 18d. The seat element 106d of the seat unit 14d is adhesively bonded onto the upper side 126d of the base body 24d. The seat element 106d of the seat unit 14d is adhesively bonded into a depression on the upper side 126d of the base body 24d.

When in use, the user sits on the seat surface 108d of the seat unit 14d. When in use, a user's weight is directed by way of the seat unit 14d to the base body 24d of the storage unit 18d. From the base body 24d of the storage unit 18d the weight is directed to the footboard 30d.

The second fastening unit 34d of the seat device 10d is releasably connectable to the steering rod 32d of the kick scooter 12d'. The second fastening unit 34d is configured so as to be integral with the base body 24d of the storage unit 18d of the seat device 10d. The second fastening unit 34d has a receiving element 36d. In a mounted state of the seat device 10d on the kick scooter 12d', the receiving element 36d is provided in order to encompass the steering rod 32d of the kick scooter 12d'. In a mounted state of the seat device 10d on the kick scooter 12d', the receiving element 36d is provided in order to encompass a rod region 58d of the steering rod 32d. Furthermore, in a mounted state of the seat device 10d, the receiving element 36d encompasses a receiving region (not visible in more detail) of the kick scooter 12d', in which the steering rod 32d is connected to a base body 40d of the kick scooter 12d'. The receiving element 36d is disposed on the front side (not visible in more detail) of the base body 24d. The receiving element 36d is configured so as to be annular. The receiving element 36d of the second fastening unit 34d has a through-opening (not visible in more detail) which in one plane has a closed uninterrupted outer contour. In a mounted state, the steering rod 32d engages through the through-opening. In order for the second fastening unit 34d of the seat device 10d to be fastened to the kick scooter 12d' the steering rod 32d has to be separated from the base body 40d. The steering rod 32d here is separated from the base body 40d by releasing a latch mechanism (not visible in more detail). However, in principle, another connection mechanism which appears meaningful to a person skilled in the art would also be conceivable. In principle, mechanisms for which a tool is required for releasing and/or establishing the connection are also conceivable here. Subsequently, the seat device 10d may be placed onto the kick scooter 12d and optionally fixed by way of the first fastening unit 16d. In a next step, the steering rod 32d along its main extension direction 56d is taken through the through-opening of the second fastening unit 34d in the direction of the base body 40d of the kick scooter 12d' and subsequently latched thereto.

FIG. 18 shows the seat device 10d, an adapter device 136d, and a kick scooter 12d. The seat device 10d, the adapter device 136d, and the kick scooter 12d form a system. The kick scooter 12d is configured so as to be identical with the kick scooter 12a described in the first exemplary embodiment of FIGS. 1 to 14.

In a mounted state of the seat device 10d the adapter device 136d is fastened to the kick scooter 12d in a releasable manner which is not visible in more detail on the footboard 30d of the kick scooter 12d. Furthermore, in a mounted state, the adapter device 136d is connected in a releasable manner which is not visible in more detail to the first fastening unit 16d of the seat device 10d. The adapter device 136d is disposed between the lower side of the base body 24d of the storage unit 18d and an upper side of the footboard 30d of the kick scooter 12d. The adapter device 136d serves for adjusting the height of the seat device 10d. On account thereof, various seat heights may be realized by a variety of adapter devices 136d, for example. Furthermore, on account thereof, the seat device 10d may be mounted both on the kick scooter 12d—using the adapter device 136d—as well as on the kick scooter 12d'—without the adapter device 136. Here, in particular other adapter devices 136d for further kick scooters and other vehicles would be conceivable.

FIG. 19 shows a further alternative seat device 10e according to the invention for a kick scooter 12e'. The kick scooter 12e' and the seat device 10e form a system 38e. The kick scooter 12e' is configured so as to be identical with the kick scooter 12d' described in the fourth exemplary embodiment of FIGS. 17 and 18.

The seat device 10e has a seat unit 14e, a storage unit 18e, a first fastening unit 16e, and a second fastening unit 34e.

The seat device 10e has a storage unit 18e. The storage unit 18e has a base body 24e and an opening body 26e which is movable in relation to the base body 24e. The base body 24e forms a cavity. The base body 24e is configured so as to be approximately box-shaped. The base body 24e approximately has the shape of a prism having a trapezoidal footprint, wherein the trapezoidal footprint is formed by a lateral area 122e, 122e' of the base body 24e. The base body 24e has two approximately trapezoidal lateral areas 122e, 122e'. Here, a long side of the trapeze is located on a side which faces away from a footboard 30e. Furthermore, the base body 24e has a material rear side 138e, a material front side (not visible in more detail), and a material lower side (not visible in more detail). An upper side of the base body 24e is opened. The lower side (not visible in more detail) of the base body 24e, in a mounted state of the seat device 10e, bears directly onto the footboard 30e of the kick scooter 12e'. The front side (not visible in more detail) of the base body 24e, in a mounted state of the seat device 10e, faces a steering rod 32e of the kick scooter 12e'. A rear region of the base body 24e in the region of the rear side 138e is composed of a transparent material. On account thereof, it is possible in particular to see through an outer wall into the cavity of the base body 24e.

The opening body 26e is disposed on the opened upper side of the base body 24e. The opening body 26e is formed by a flap. In a closed state, the opening body 26e closes the upper side of the base body 24e and locks the latter. The opening body 26e is mounted so as to be movable in relation to the base body 24e. The opening body 26e is movable in relation to the base body 24e by way of a rotational axis 140e. In the case of the base body 24e, the rotational axis 140e is defined between the lateral areas 122e, close to the front side of the base body 24e and close to the opened upper side of the base body 24e. In the case of the opening body 26e, the rotational axis 140e is disposed in a front end region 142e. The rotational axis 140e is implemented by way of a hinge. However, in principle, another implementation and/or arrangement of the rotational axis 140e which appear/appears meaningful to a person skilled in the art would also be conceivable. A handle 146e is disposed on a rear end region 144e of the opening body 26e which is opposite the front end region 142e of the opening body 26e. By way of the handle 146e the opening body 26e may be moved in relation to the base body 24e. The opening body 26e may be opened or closed, respectively, by way of the handle 146e.

Furthermore, the base body 24e has a lighting element 104e. The lighting element 104e is integrated in the cavity of the base body 24e.

Furthermore, the storage unit 18e has a receiving region 20e. The receiving region 20e is provided for receiving objects 22e. The receiving region 20e is substantially delimited by the base body 24e. The receiving region 20e is formed by the cavity of the base body 24e. In one state, the receiving region 20e is approximately completely enclosed. In a closed state, the receiving region 20e is approximately completely enclosed. The receiving region 20e is delimited in five spatial directions by the base body 24e. Furthermore, the receiving region 20e, in the sixth spatial direction, is approximately completely delimited by the opening body 26e. The receiving region 20e may be rendered accessible by way of the opening body 26e. To this end, the opening body 26e is swung upwards by way of the handle 146e. The opening body 26e here is moved from a closed state to an opened state.

The seat device 10e furthermore has the seat unit 14e. The seat unit 14e has a seat element 106e with an upholstered seat surface 108e. The seat element 106e is partially composed of an elastomer by way of which the seat surface 108e is soft and upholstered. However, in principle, another material configuration of the seat element 106e which appears meaningful to a person skilled in the art would also be conceivable. The seat unit 14e is configured so as to be partially integral with the storage unit 18e. The seat unit 14e is configured so as to be integral with the opening body 26e of the storage unit 18e. The seat unit 14e is adhesively bonded to the opening body 26e of the storage unit 18e. The seat element 106e of the seat unit 14e is adhesively bonded onto an upper side of the opening body 26e. The seat element 106e of the seat unit 14e extends across a complete upper side of the opening body 26e.

When in use, the user sits on the seat surface 108e of the seat unit 14e. When in use, a weight of the user is directed by way of the seat unit 14e to the base body 24e of the storage unit 18e. From the base body 24e of the storage unit 18e the weight is directed to the footboard 30e.

The second fastening unit 34e of the seat device 10e is connectable in a releasable manner to the steering rod 32e of the kick scooter 12e'. The second fastening unit 34e is configured so as to be identical with the second fastening unit 34d described in the fourth exemplary embodiment of FIGS. 17 and 18.

FIG. 20 shows the seat device 10e, an adapter device 136e, and a kick scooter 12e. The seat device 10e, the adapter device 136e, and the kick scooter 12e form a system. The kick scooter 12e is configured so as to be identical with the kick scooter 12a described in the first exemplary embodiment of FIGS. 1 to 14. The adapter device 136e is configured so as to be identical with the adapter device 136d described in the fourth exemplary embodiment of FIGS. 17 and 18.

The invention claimed is:

1. A seat device for a kick scooter having a steering rod and a footboard, the seat device comprising:
    a seat unit;
    at least one first fastening unit;
    at least one storage unit with at least one receiving region that is provided for receiving objects and is enclosed in a closed state; and
    at least one second fastening unit,
    wherein the at least one fastening unit releasably fastens the seat device to the footboard of the kick scooter and the at least one second fastening unit releasably fastens the seat device to the steering rod of the kick scooter,
    wherein the at least one storage unit comprises at least one base body and at least one opening body, which is at least partially movable with respect to the base body, wherein the receiving region can be made at least partially accessible via the opening body, and
    wherein the receiving region of the at least one storage unit can be made accessible at least partially via a sliding motion of the at least one opening body with respect to the at least one base body.

2. The seat device according to claim 1, wherein the at least one opening body of the at least one storage unit is implemented at least partially by a slide-box.

3. The seat device according to claim 1, wherein the seat unit is embodied at least partially in a one-part implementation with the at least one storage unit.

4. The seat device according to claim 1, wherein the seat unit is embodied at least partially in a one-part implementation with the at least one base body of the at least one storage unit.

5. The seat device according to claim 1, wherein the at least one first fastening unit comprises at least one support surface, which is in a mounted state provided to support at least one of the seat unit and the storage unit at least against the footboard of the kick scooter.

6. The seat device according to claim 1, wherein the at least one second fastening unit comprises at least one receiving element, which is provided in a mounted state to at least partially engage around the steering rod.

7. The seat device according to claim 1, further comprising
    at least one push rod fastening unit for fastening an optional push rod.

8. The seat device according to claim 7, wherein the at least one push rod fastening unit comprises at least one functional opening, which is provided for receiving at least one partial region of the optional push rod.

9. The seat device according to claim 7, wherein the optional push rod comprises:
    a fastening unit with at least one guiding region, which is provided to be guided through the functional opening of the at least one push rod fastening unit of the seat device, and with at least one securing element which is provided for fixing the fastening unit to the seat device.

10. The seat device according to claim 9, wherein the at least one securing element is provided to engage in at least one groove of the guiding region to the purpose of fixing the fastening unit to the seat device.

11. A seat system with the seat device according to claim 9, wherein
    the seat device comprises at least one receiving element for at least partially receiving the push rod in a demounted state.

12. The seat system according to claim 11, wherein the at least one receiving element is implemented at least partially by a storage unit of the seat device, and is provided for receiving in a receiving region of the storage unit at least one base body of the push rod in a demounted state.

* * * * *